(12) United States Patent
Wang et al.

(10) Patent No.: US 11,968,075 B2
(45) Date of Patent: Apr. 23, 2024

(54) APPLICATION SESSION-SPECIFIC NETWORK TOPOLOGY GENERATION FOR TROUBLESHOOTING THE APPLICATION SESSION

(71) Applicant: Juniper Networks, Inc., Sunnyvale, CA (US)

(72) Inventors: Jisheng Wang, Palo Alto, CA (US); Xiaoying Wu, Sunnyvale, CA (US); Yedunandan Siddalingappa-Vitalapur, Bishan (SG); Abhiram Madhugiri Shamsundar, San Jose, CA (US); Robert J. Friday, Los Gatos, CA (US); Sudheer Matta, Mountain House, CA (US); Sunalini Sankhavaram, Saratoga, CA (US); Kush Shah, Santa Clara, CA (US); Randall Frei, San Jose, CA (US); Sujai Hajela, Saratoga, CA (US); Jacob Thomas, Saratoga, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/935,704

(22) Filed: Sep. 27, 2022

(65) Prior Publication Data
US 2023/0231762 A1    Jul. 20, 2023

Related U.S. Application Data

(60) Provisional application No. 63/299,733, filed on Jan. 14, 2022.

(51) Int. Cl.
*H04L 41/0631* (2022.01)
*H04L 41/0604* (2022.01)
(Continued)

(52) U.S. Cl.
CPC ........ *H04L 41/064* (2013.01); *H04L 41/0627* (2013.01); *H04L 41/12* (2013.01); *H04L 41/22* (2013.01)

(58) Field of Classification Search
CPC ... H04L 41/064; H04L 41/0627; H04L 41/12; H04L 41/22
See application file for complete search history.

(56) References Cited

U.S. PATENT DOCUMENTS

| 7,624,167 B1 | 11/2009 | Benjamin |
| 9,729,439 B2 | 8/2017 | MeLampy et al. |

(Continued)

FOREIGN PATENT DOCUMENTS

| EP | 3937425 A1 | 1/2022 |
| WO | 2010011682 A1 | 1/2010 |

OTHER PUBLICATIONS

U.S. Appl. No. Jun. 24, 2022, filed Jun. 24, 2022, naming inventors Wang_ et al.

(Continued)

*Primary Examiner* — John M MacIlwinen
(74) *Attorney, Agent, or Firm* — Shumaker & Sieffert, P.A.

(57) ABSTRACT

A network management system (NMS) is described that provides a granular troubleshooting workflow at an application session level using an application session-specific topology from a client device to a cloud-based application server. During an application session of a cloud-based application, a client device running the application exchanges data through one or more access point (AP) devices, one or more switches at a wired network edge, and one or more network nodes, e.g., switches, routers, and/or gateway devices, to reach a cloud-based application server. For a particular application session, the NMS generates a topology based on network data received from a subset of (Continued)

network devices, e.g., client devices, AP devices, switches, routers, and/or gateways, that were involved in the particular application session over a duration of the particular application session. In this way, the NMS enables backward-looking troubleshooting of the particular application session.

18 Claims, 12 Drawing Sheets

(51) Int. Cl.
*H04L 41/12* (2022.01)
*H04L 41/22* (2022.01)

(56) References Cited

U.S. PATENT DOCUMENTS

| | | | |
|---|---|---|---|
| 9,729,682 | B2 | 8/2017 | Kumar et al. |
| 9,762,485 | B2 | 9/2017 | Kaplan et al. |
| 9,832,082 | B2 | 11/2017 | Dade et al. |
| 9,871,748 | B2 | 1/2018 | Gosselin et al. |
| 9,985,883 | B2 | 5/2018 | MeLampy et al. |
| 10,198,511 | B1 | 2/2019 | Gupta et al. |
| 10,200,264 | B2 | 2/2019 | Menon et al. |
| 10,277,506 | B2 | 4/2019 | Timmons et al. |
| 10,290,129 | B2 | 5/2019 | Madsen |
| 10,432,522 | B2 | 10/2019 | Kaplan et al. |
| 10,693,739 | B1 | 6/2020 | Naseri et al. |
| 10,756,983 | B2 | 8/2020 | Ratkovic et al. |
| 10,862,742 | B2 | 12/2020 | Singh |
| 10,958,537 | B2 | 3/2021 | Safavi |
| 10,958,585 | B2 | 3/2021 | Safavi |
| 10,985,969 | B2 | 4/2021 | Safavi |
| 10,992,543 | B1 * | 4/2021 | Rachamadugu .... H04L 41/0869 |
| 11,075,824 | B2 | 7/2021 | McCulley et al. |
| 2003/0009552 | A1 * | 1/2003 | Benfield ................. H04L 41/22 709/224 |
| 2006/0059125 | A1 * | 3/2006 | Yan ......................... H04L 67/02 |
| 2007/0268294 | A1 | 11/2007 | Eagen et al. |
| 2008/0298373 | A1 | 12/2008 | Lapuh et al. |
| 2016/0080502 | A1 * | 3/2016 | Yadav ................. H04L 12/4633 709/227 |
| 2016/0234099 | A1 | 8/2016 | Jiao |
| 2016/0294642 | A1 * | 10/2016 | Hopkins ............. H04L 43/0864 |
| 2017/0083572 | A1 | 3/2017 | Tankersley et al. |
| 2017/0358111 | A1 | 12/2017 | Madsen |
| 2018/0121808 | A1 * | 5/2018 | Ramakrishna ...... G06F 11/0709 |
| 2018/0143891 | A1 | 5/2018 | Polisetty |
| 2018/0365336 | A1 | 12/2018 | Raghavendra et al. |
| 2019/0104413 | A1 | 4/2019 | Cidon et al. |
| 2019/0280949 | A1 * | 9/2019 | Wang ..................... H04L 41/22 |
| 2020/0153697 | A1 | 5/2020 | Turner et al. |
| 2021/0306201 | A1 | 9/2021 | Wang et al. |
| 2021/0328877 | A1 * | 10/2021 | Jung ..................... H04L 41/065 |
| 2021/0349977 | A1 * | 11/2021 | Kishikawa .......... H04W 12/122 |
| 2022/0182278 | A1 * | 6/2022 | Vangapalli ............. H04L 67/30 |
| 2023/0016199 | A1 * | 1/2023 | Jividen ................. H04L 41/064 |

OTHER PUBLICATIONS

U.S. Appl. No. 17/647,954, filed Jan. 13, 2022, naming inventors Jisheng Wang et al.
U.S. Appl. No. 63/300,166, filed Jan. 17, 2022, naming inventors Wu et al.
"802.1AB-REV—Station and Media Access Control Connectivity Discovery," https://www.ieee802.org/1/pages/802.1AB-rev.html, Last Modified on Jun. 30, 2009, 4 pp.
"ArangoGraph Insights Platform," retrieved from https://www.arangodb.com/ on Jul. 18, 2023, 4 pp.
Aruba: "Aruba Central User Guide", 1-20 Feb. 1, 2017 (Feb. 1, 2017), XP055593282, Retrieved from the Internet: URL: https://community.arubanetworks.com/aruba/attachments/aruba/SoftwareUserReferenceGuides/82/1/aruba%20central%20user%20guide.pdf [retrieved on Jun. 3, 2019], pp. 1-190.
Estrin, Deborah, et al., Network Visualization with the VINT Network Animator Nam, Tech. Report 99-703, Computer Science Dept., Univ. Southern California, Los Angeles, Mar. 4, 1999, 8 pp.
Extended Search Report from counterpart European Application No. 22210902.7 dated May 15, 2023, 12 pp.
Jiang, Jian, et al. "Constraint conditions to eliminate AS Incentive of Lying in Interdomain Routing," 2013 IFIP/IEEE International Symposium on Integrated Network Management (IM 2013), IEEE, Year: 2013, 7 pp.
Medeiros, Joao P.S. and dos Santos, Selan R., "Radial Net: An interactive network topology visualization tool with visual auditing support," Critical Information Infrastructure Security: Third International Workshop, CRITIS 2008, Year: 2009, 12 pp.
Response to Extended Search Report dated May 15, 2023, from counterpart European Application No. 22210902.7 filed Jan. 6, 2024, 37 pp.

* cited by examiner

US 11,968,075 B2

APPLICATION SESSION-SPECIFIC NETWORK TOPOLOGY GENERATION FOR TROUBLESHOOTING THE APPLICATION SESSION

This application claims the benefit of U.S. Provisional Patent Application No. 63/299,733, filed 14 Jan. 2022, the entire contents of which is incorporated herein by reference.

TECHNICAL FIELD

The disclosure relates generally to computer networks and, more specifically, to monitoring and troubleshooting computer networks.

BACKGROUND

Commercial premises or sites, such as offices, hospitals, airports, stadiums, or retail outlets, often install complex wireless network systems, including a network of wireless access points (APs), throughout the premises to provide wireless network services to one or more wireless client devices (or simply, "clients"). APs are physical, electronic devices that enable other devices to wirelessly connect to a wired network using various wireless networking protocols and technologies, such as wireless local area networking protocols conforming to one or more of the IEEE 802.11 standards (i.e., "Wi-Fi"), Bluetooth/Bluetooth Low Energy (BLE), mesh networking protocols such as ZigBee or other wireless networking technologies. Many different types of wireless client devices, such as laptop computers, smartphones, tablets, wearable devices, appliances, and Internet of Things (IoT) devices, incorporate wireless communication technology and can be configured to connect to wireless access points when the device is in range of a compatible wireless access point in order to access a wired network. In the case of a client device running a cloud-based application, such as voice over Internet Protocol (VOIP) applications, streaming video applications, gaming applications, or video conference applications, data is exchanged during an application session from the client device through one or more APs and one or more wired network devices, e.g., switches, routers, and/or gateway devices, to reach the cloud-based application server.

SUMMARY

In general, this disclosure describes one or more techniques for a network management system (NMS) to provide a granular troubleshooting workflow at an application session level using an application session-specific topology from a client device to a cloud-based application server. During an application session of a cloud-based application, e.g., a VOIP or video conference call, a streaming video viewing session, or a gaming session, a client device running the application exchanges data through one or more access point (AP) devices, one or more switches at a wired network edge, and one or more network nodes, e.g., switches, routers, and/or gateway devices, to reach a cloud-based application server.

In accordance with the disclosed techniques, for a particular application session, the NMS generates a topology based on data received from a subset of network devices, e.g., client devices, AP devices, switches, routers, and/or gateways, that were involved in the particular application session over a duration of the particular application session. More specifically, the NMS may build the application-session specific topology based on data for the particular application session retrieved from a temporal graph database of the network. The temporal graph database is configured to store entity and connectivity information extracted from historical data collected from the network devices at an application session-level granularity over an extended period of time, e.g., weeks or months. In this way, the disclosed techniques enable backward-looking troubleshooting of the particular application session, even if a current network topology has changed after the particular application session concludes or if a current application session does not experience the same issues as the particular application session.

The disclosed techniques enable troubleshooting of the particular application session by identifying connectivity issues at one or more of a subset of network devices involved in the particular application session. For example, the NMS may generate data representative of a user interface to provide to a user, e.g., a site or network administrator, visualization of the application session-specific topology including color-coding, icons, or other indicia of connectivity issues within the topology over the duration of the particular application session. In response to user input selecting an icon indicative of a network device identified as having connectivity issues during the particular application session, the NMS may further generate a troubleshooting user interface for the network device or may redirect the user to a customer insight or recommended action user interface specific to the network device.

In addition, the disclosed techniques enable identification of third-party application servers and other third-party network devices involved with the particular application session to provide a complete topology from client device to the cloud-based application server. For example, the NMS may determine which switches, routers, and/or gateways are connected to the third-party application server, third-party service provider server, or other third-party network devices based on uplink data (e.g., LLDP advertisements) included in the data received from the switches, routers, and/or gateways during the particular application session. The NMS may then determine entity ID data (e.g., an IP address or interface address) of the third-party network devices. In some examples, the NMS may have some integration with third-party application/service performance monitoring (APM) vendors to retrieve insights data for application services and/or service providers via application programming interfaces (APIs) in order to determine whether the application services and/or service providers are down or experiencing issues.

In one example, this disclosure describes a network management system that includes a memory storing network data received from a plurality of network devices configured to provide client-to-cloud connectivity in a network; and one or more processors coupled to the memory and configured to: receive a query identifying an application session of an application running on a client device, wherein the client device comprises one of the plurality of network devices; retrieve entity information and connectivity information for the application session from a temporal graph database, wherein the entity information represents a subset of network devices, from the plurality of network devices, involved with the application session over a duration of the application session and is stored as nodes of the temporal graph database, wherein the connectivity information represents connections between the subset of network devices over the duration of the application session and is stored as edges of the temporal graph database, and wherein the temporal graph database represents a history of at least a portion of the network at application session-level granularity over a time period; generate an application session-specific topology for the application session based on the entity information and the connectivity information for the application session; identify at least one connectivity issue within the subset of network devices during the application session based at least on the network data received from the subset of network devices during the application session; and generate data representative of a user interface for presentation on an administrator device, the user interface including a visualization of the application session-specific topology over the duration of the application session including an indication of the at least one connectivity issue.

In another example, this disclosure describes a method that includes receiving, by a network management system, a query identifying an application session of an application running on a client device, wherein the client device comprises one of a plurality of network devices configured to provide client-to-cloud connectivity in a network; retrieving, by the network management system, entity information and connectivity information for the application session from a temporal graph database, wherein the entity information represents a subset of network devices, from the plurality of network devices, involved with the application session over a duration of the application session and is stored as nodes of the temporal graph database, wherein the connectivity information represents connections between the subset of network devices over the duration of the application session and is stored as edges of the temporal graph database, and wherein the temporal graph database represents a history of at least a portion of the network at application session-level granularity over a time period; generating, by the network management system, an application session-specific topology for the application session based on the entity information and the connectivity information for the application session; identifying, by the network management system, at least one connectivity issue within the subset of network devices during the application session based at least on network data received from the subset of network devices during the application session; and generating, by the network management system, data representative of a user interface for presentation on an administrator device, the user interface including a visualization of the application session-specific topology over the duration of the application session including an indication of the at least one connectivity issue.

In another example, this disclosure describes a computer-readable storage medium including instructions that, when executed, cause one or more processors of a network management system to: receive a query identifying an application session of an application running on a client device, wherein the client device comprises one of a plurality of network devices configured to provide client-to-cloud connectivity in a network; retrieve entity information and connectivity information for the application session from a temporal graph database, wherein the entity information represents a subset of network devices, from the plurality of network devices, involved with the application session over a duration of the application session and is stored as nodes of the temporal graph database, wherein the connectivity information represents connections between the subset of network devices over the duration of the application session and is stored as edges of the temporal graph database, and wherein the temporal graph database represents a history of at least a portion of the network at application session-level granularity over a time period; generate an application session-specific topology for the application session based on the entity information and the connectivity information for the application session; identify at least one connectivity issue within the subset of network devices during the application session based at least on network data received from the subset of network devices during the application session; and generate data representative of a user interface for presentation on an administrator device, the user interface including a visualization of the application session-specific topology over the duration of the application session including an indication of the at least one connectivity issue.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1A:
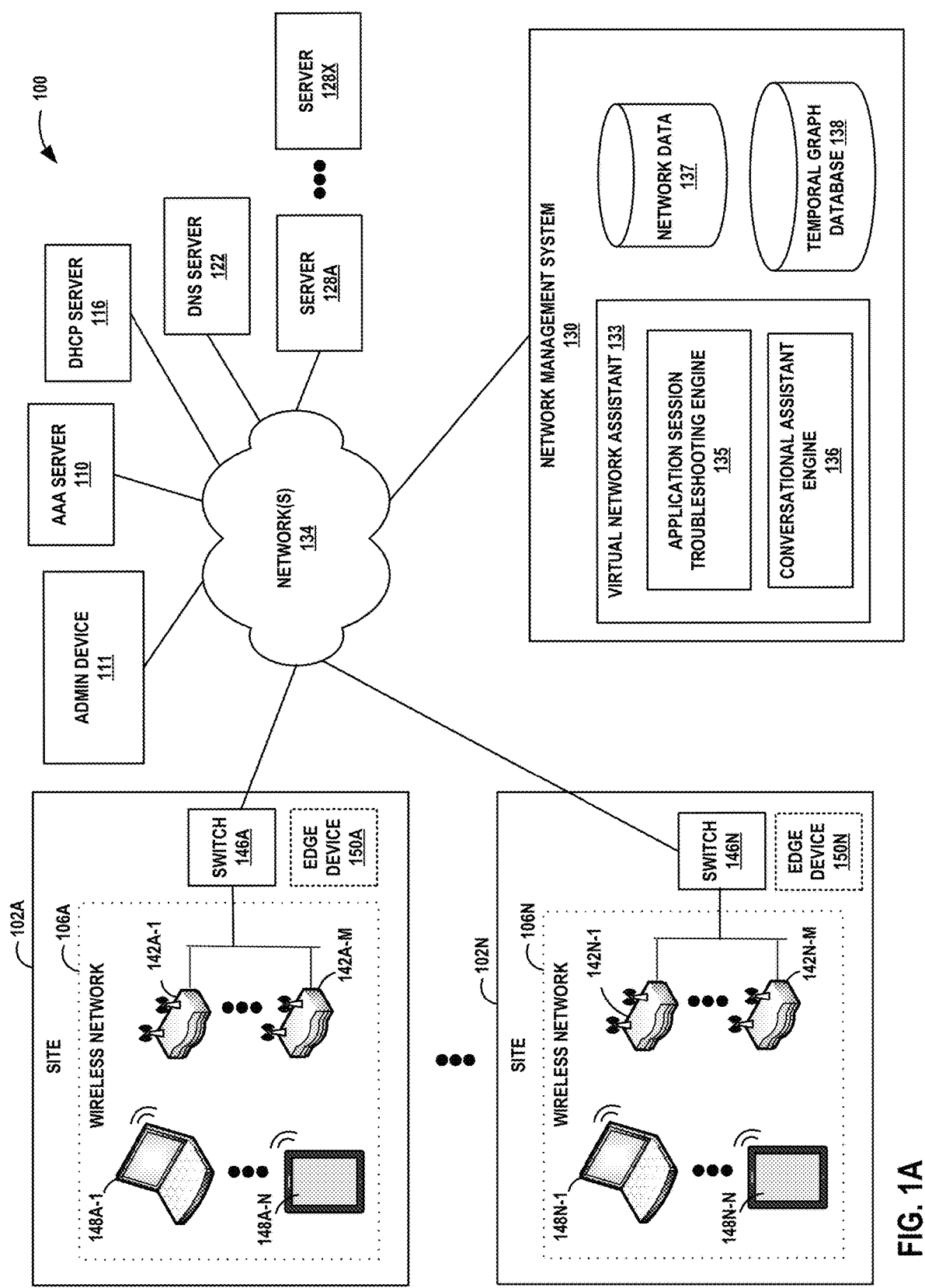
FIG. 1A is a block diagram of an example network system in which a network management system provides a granular troubleshooting workflow at an application session level using an application session-specific topology from a client device to a cloud-based application server, in accordance with one or more techniques of the disclosure.

FIG. 1A is a block diagram of an example network system 100 in which a network management system (NMS) 130 provides a granular troubleshooting workflow at an application session level using an application session-specific topology from a client device to a cloud-based application server, in accordance with one or more techniques of this disclosure. Example network system 100 includes a plurality sites 102A-102N at which a network service provider manages one or more wireless networks 106A-106N, respectively. Although in FIG. 1A each site 102A-102N is shown as including a single wireless network 106A-106N, respectively, in some examples, each site 102A-102N may include multiple wireless networks, and the disclosure is not limited in this respect.

Each site 102A-102N includes a plurality of network access server (NAS) devices, such as access points (APs) 142, switches 146, or routers (not shown) within the wired network edge. For example, site 102A includes a plurality of APs 142A-1 through 142A-M. Similarly, site 102N includes a plurality of APs 142N-1 through 142N-M. Each AP 142 may be any type of wireless access point, including, but not limited to, a commercial or enterprise AP, a router, or any other device that is connected to the wired network and is capable of providing wireless network access to client devices within the site.

Each site 102A-102N also includes a plurality of client devices, otherwise known as user equipment devices (UEs), referred to generally as UEs or client devices 148, representing various wireless-enabled devices within each site. For example, a plurality of UEs 148A-1 through 148A-N are currently located at site 102A. Similarly, a plurality of UEs 148N-1 through 148N-N are currently located at site 102N. Each UE 148 may be any type of wireless client device, including, but not limited to, a mobile device such as a smart phone, tablet or laptop computer, a personal digital assistant (PDA), a wireless terminal, a smart watch, smart ring, or other wearable device. UEs 148 may also include wired client-side devices, e.g., IoT devices such as printers, security devices, environmental sensors, or any other device connected to the wired network and configured to communicate over one or more wireless networks 106.

In order to provide wireless network services to UEs 148 and/or communicate over the wireless networks 106, APs 142 and the other wired client-side devices at sites 102 are connected, either directly or indirectly, to one or more network devices (e.g., switches, routers, or the like) via physical cables, e.g., Ethernet cables. In the example of FIG. 1A, site 102A includes a switch 146A to which each of APs 142A-1 through 142A-M at site 102A are connected. Similarly, site 102N includes a switch 146N to which each of APs 142N-1 through 142N-M at site 102N are connected. Although illustrated in FIG. 1A as if each site 102 includes a single switch 146 and all APs 142 of the given site 102 are connected to the single switch 146, in other examples, each site 102 may include more or fewer switches and/or routers. In addition, the APs and the other wired client-side devices of the given site may be connected to two or more switches and/or routers. In addition, two or more switches at a site may be connected to each other and/or connected to two or more routers, e.g., via a mesh or partial mesh topology in a hub-and-spoke architecture. In some examples, interconnected switches and routers comprise wired local area networks (LANs) at sites 102 hosting wireless networks 106.

Example network system 100 also includes various networking components for providing networking services within the wired network including, as examples, an Authentication, Authorization and Accounting (AAA) server 110 for authenticating users and/or UEs 148, a Dynamic Host Configuration Protocol (DHCP) server 116 for dynamically assigning network addresses (e.g., IP addresses) to UEs 148 upon authentication, a Domain Name System (DNS) server 122 for resolving domain names into network addresses, a plurality of servers 128A-128X (collectively "servers 128") (e.g., web servers, databases servers, file servers and the like), and a network management system (NMS) 130. As shown in FIG. 1A, the various devices and systems of network 100 are coupled together via one or more network(s) 134, e.g., the Internet and/or an enterprise intranet.

In the example of FIG. 1A, NMS 130 is a cloud-based computing platform that manages wireless networks 106A-106N at one or more of sites 102A-102N. As further described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. In some examples, NMS 130 outputs notifications, such as alerts, alarms, graphical indicators on dashboards, log messages, text/SMS messages, email messages, and the like, and/or recommendations regarding wireless network issues to a site or network administrator ("admin") interacting with and/or operating admin device 111. Additionally, in some examples, NMS 130 operates in response to configuration input received from the administrator interacting with and/or operating admin device 111.

The administrator and admin device 111 may comprise IT personnel and an administrator computing device associated with one or more of sites 102 and/or switches 146 at the wired network edge. Admin device 111 may be implemented as any suitable device for presenting output and/or accepting user input. For instance, admin device 111 may include a display. Admin device 111 may be a computing system, such as a mobile or non-mobile computing device operated by a user and/or by the administrator. Admin device 111 may, for example, represent a workstation, a laptop or notebook computer, a desktop computer, a tablet computer, or any other computing device that may be operated by a user and/or present a user interface in accordance with one or more aspects of the present disclosure. Admin device 111 may be physically separate from and/or in a different location than NMS 130 such that admin device 111 may communicate with NMS 130 via network 134 or other means of communication.

In some examples, one or more of the NAS devices, e.g., APs 142, switches 146, or routers, may connect to edge devices 150A-150N via physical cables, e.g., Ethernet cables. Edge devices 150 comprise cloud-managed, wireless local area network (LAN) controllers. Each of edge devices 150 may comprise an on-premises device at a site 102 that is in communication with NMS 130 to extend certain microservices from NMS 130 to the on-premises NAS devices while using NMS 130 and its distributed software architecture for scalable and resilient operations, management, troubleshooting, and analytics.

Each one of the network devices of network system 100, e.g., servers 110, 116, 122 and/or 128, APs 142, UEs 148, switches 146, and any other servers or devices attached to or forming part of network system 100, may include a system log or an error log module wherein each one of these network devices records the status of the network device including normal operational status and error conditions. Throughout this disclosure, one or more of the network devices of network system 100, e.g., servers 110, 116, 122 and/or 128, APs 142, UEs 148, and switches 146, may be considered "third-party" network devices when owned by and/or associated with a different entity than NMS 130 such that NMS 130 does not receive, collect, or otherwise have access to the recorded status and other data of the third-party network devices. In some examples, edge devices 150 may provide a proxy through which the recorded status and other data of the third-party network devices may be reported to NMS 130.

In some examples, NMS 130 monitors network data 137, e.g., one or more service level expectation (SLE) metrics, received from wireless networks 106A-106N at each site 102A-102N, respectively, and manages network resources, such as APs 142 at each site, to deliver a high-quality wireless experience to end users, IoT devices and clients at the site. For example, NMS 130 may include a virtual network assistant (VNA) 133 that implements an event processing platform for providing real-time insights and simplified troubleshooting for IT operations, and that automatically takes corrective action or provides recommendations to proactively address wireless network issues. VNA 133 may, for example, include an event processing platform configured to process hundreds or thousands of concurrent streams of network data 137 from sensors and/or agents associated with APs 142 and/or nodes within network 134. For example, VNA 133 of NMS 130 may include an underlying analytics and network error identification engine and alerting system in accordance with various examples described herein. The underlying analytics engine of VNA 133 may apply historical data and models to the inbound event streams to compute assertions, such as identified anomalies or predicted occurrences of events constituting network error conditions. Further, VNA 133 may provide real-time alerting and reporting to notify a site or network administrator via admin device 111 of any predicted events, anomalies, trends, and may perform root cause analysis and automated or assisted error remediation. In some examples, VNA 133 of NMS 130 may apply machine learning techniques to identify the root cause of error conditions detected or predicted from the streams of network data 137. If the root cause may be automatically resolved, VNA 133 may invoke one or more corrective actions to correct the root cause of the error condition, thus automatically improving the underlying SLE metrics and also automatically improving the user experience.

Further example details of operations implemented by the VNA 133 of NMS 130 are described in U.S. Pat. No. 9,832,082, issued Nov. 28, 2017, and entitled "Monitoring Wireless Access Point Events," U.S. Publication No. US 2021/0306201, published Sep. 30, 2021, and entitled "Network System Fault Resolution Using a Machine Learning Model," U.S. Pat. No. 10,985,969, issued Apr. 20, 2021, and entitled "Systems and Methods for a Virtual Network Assistant," U.S. Pat. No. 10,958,585, issued Mar. 23, 2021, and entitled "Methods and Apparatus for Facilitating Fault Detection and/or Predictive Fault Detection," U.S. Pat. No. 10,958,537, issued Mar. 23, 2021, and entitled "Method for Spatio-Temporal Modeling," and U.S. Pat. No. 10,862,742, issued Dec. 8, 2020, and entitled "Method for Conveying AP Error Codes Over BLE Advertisements," all of which are incorporated herein by reference in their entirety.

In operation, NMS 130 observes, collects and/or receives network data 137, which may take the form of data extracted from messages, counters, and statistics, for example. In accordance with one specific implementation, a computing device is part of NMS 130. In accordance with other implementations, NMS 130 may comprise one or more computing devices, dedicated servers, virtual machines, containers, services, or other forms of environments for performing the techniques described herein. Similarly, computational resources and components implementing VNA 133 may be part of the NMS 130, may execute on other servers or execution environments, or may be distributed to nodes within network 134 (e.g., routers, switches, controllers, gateways, and the like).

In accordance with one or more techniques of this disclosure, NMS 130 is configured to provide a granular troubleshooting workflow at an application session level using an application session-specific topology from a client device, e.g., one of UEs 148, to a cloud-based application server. During an application session of a cloud-based application, e.g., a VOIP or video conference call, a streaming video viewing session, or a gaming session, a client device 148 running the application exchanges data through one or more AP devices 142, one or more switches 146 at the wired network edge, and one or more nodes within network 134 (e.g., routers, switches, controllers, gateways, and the like) to reach a cloud-based application server.

In accordance with the disclosed techniques, for a particular application session, application session troubleshooting engine 135 of VNA 133 generates a topology based on network data 137 received from a subset of network devices, e.g., client devices 148, AP devices 142, switches 146, and/or network nodes, that were involved in the particular application session over a duration of the particular application session. For example, temporal graph database 138 is configured to store connectivity and entity information of network system 100 extracted from historical telemetry data collected from client devices 148, APs 142, switches 146, and/or other network nodes within network 134 at an application session-level granularity over an extended period of time, e.g., weeks or months.

Application session troubleshooting engine 135 of VNA 133 may build an application-session specific topology for a particular application session based on the entity and connectivity information for the particular application session retrieved from temporal graph database 138. In this way, the disclosed techniques enable backward-looking troubleshooting of the particular application session, even if a current network topology has changed after the particular application session concludes or if a current application session does not experience the same issues as the particular application session.

The disclosed techniques enable troubleshooting of the particular application session by identifying connectivity issues at one or more of a subset of network devices involved with the particular application session over the duration of the particular application session. For example, application session troubleshooting engine 135 of VNA 133 may generate data representative of a user interface to provide to a user, e.g., a site or network administrator using admin device 111, visualization of the application session-specific topology including color-coding, icons, or other indicia of connectivity issues within the topology over the duration of the particular application session. In response to user input selecting an icon indicative of a network device identified as having connectivity issues during the particular application session, application session troubleshooting engine 135 of VNA 133 may further generate a troubleshooting user interface for the network device or may redirect the user to a customer insight or recommended action user interface specific to the network device.

In addition, the disclosed techniques enable identification of third-party application servers, third-party service provider servers, and other third-party network devices involved with the particular application session to provide a complete topology from client device to the cloud-based application server. For example, application session troubleshooting engine 135 of VNA 133 may determine which switches, routers, and/or gateways are connected to the third-party application server, third-party service provider server, or other third-party network devices based on uplink data (e.g., LLDP advertisements) included in network data 137 received from the switches, routers, and/or gateways during the particular application session. Application session troubleshooting engine 135 of VNA 133 may then determine entity ID data (e.g., an IP address or interface address) of the third-party network devices.

In some examples, application session troubleshooting engine 135 of VNA 133 may have some integration with third-party application/service performance monitoring (APM) vendors to retrieve insights data associated with the third-party network devices to help determine a root cause of the user-impacting network issues. For example, when a user encounters a quality issue of an online application or service, e.g., Microsoft Teams®, it is possible that the service itself, e.g., Teams, or the service provider, e.g., Comcast Cable®, is down or experiencing issues. As discussed above, NMS 130 does not receive, collect, or otherwise have access to the recorded status and other data of the third-party network devices. Instead, NMS 130 may leverage insights data from third-party APM vendors to perform troubleshooting and determine the root cause of network issues.

NMS 130 may handle the third-party integration in two different ways: on-demand or proactive. For on-demand third-party integration, application session troubleshooting engine 135 may query the third-party APM vendors via API for insights data of online application services and/or service providers in response to a request for troubleshooting of a specific application session experiencing issues. For proactive third-party integration, application session troubleshooting engine 135 may proactively query the third-party APM vendors for insights data of online application services and/or service providers to perform monitoring and detection of the online application services and/or service providers.

In some examples, the site or network administrator, e.g., using admin device 111, may initiate the topology visualization and troubleshooting of the particular application session via a conversational assistant engine 136 of VNA 133. Conversational assistant engine 136 may be configured to process user inputs, such as text strings, and generate responses. In some examples, conversational assistant engine 136 may include one or more natural language processors configured to process the user inputs. Conversational assistant engine 136 may be configured to conduct a chat conversation that simulates a way a human would behave as a conversation partner, which may help to simplify and/or improve a satisfaction of an administrator monitoring and controlling a network.

In accordance with one or more techniques of the disclosure, conversational assistant engine 136 may generate a conversational assistant configured to receive user input. In a specific use case, the admin, via admin device 111, may enter a query for a particular network device and/or a particular application session into conversational assistant engine 136. Conversational assistant engine 136 may provide a platform in which to present the application session-specific topology to the admin and with which the admin may interact with the application session-specific topology.

For instance, the conversational assistant may receive a string indicating the application, a duration, and/or a device identifier (e.g., "troubleshoot teams call from client device A," where "teams call" indicates the application and "client device A" comprises a client device identifier; or "how is DC84AP544 during last 7 days," where "DC84AP544" comprises an AP device identifier and "7 days," indicates a duration). In some instances, the conversational assistant may receive a string indicating the application, a duration, and/or a user identifier (e.g., "troubleshoot user B teams call," where "user B" is a user of a client device and "teams call" indicates the application). Conversational assistant engine 136 may determine the particular network device of the plurality of network devices based on the user input, and determine one or more application sessions in which the particular network device was involved. Conversational assistant engine 136 may automatically filter the application sessions of the particular network device based on, for example, the indicated application and/or the indicated duration if provided in the user input to the conversational assistant. In one scenario where additional session identifying information is not included in the user input, conversational assistant engine 136 may identify all application sessions of the particular network device within a default duration, e.g., today or last 7 days. In another scenario where additional session identifying information is not included in the user input, conversational assistant engine 136 may filter out the high quality application sessions to identify one or more application sessions of the particular network device that experienced connectivity issues most recently or within the default duration.

Upon identifying the particular application session, application session troubleshooting engine 135 builds the application-session specific topology for the particular application session based on data for the particular application session retrieved from temporal graph database 138. Application session troubleshooting engine 135 generates data representative of the application session-specific topology for presentation within the conversational assistant to the administrator using admin device 111. The visualization includes color-coding, icons, or other indicia of connectivity issues within the topology over the duration of the particular application session, as determined by application session troubleshooting engine 135 based on the temporal data stored as network data 137 and/or temporal graph database 138. In this example, the administrator using admin device 111 may interact with the application session-specific topology presented within the conversational assistant to select an icon indicative of a network device in the topology identified as having connectivity issues during the particular application session. In response to the selection of the network device, application session troubleshooting engine 135 may further generate a troubleshooting user interface for the network device for presentation within the conversational assistant. Alternatively, application session troubleshooting engine 135 may redirect the user to a customer insight or recommended action user interface specific to the network device. Additional information with respect to the conversational assistant is described in U.S. patent application Ser. No. 17/647,954, filed Jan. 13, 2022, entitled "CONVERSATIONAL ASSISTANT FOR OBTAINING NETWORK INFORMATION," herein by reference in its entirety.

The techniques of this disclosure provide one or more technical advantages and practical applications. For example, the techniques enable determination of an application session-specific topology from client to cloud to enable troubleshooting of a particular application session based on the topology and connectivity issues associated with the particular application session over a duration of the particular application session. The techniques enable backward-looking troubleshooting to determine what caused a poor quality session, even if the current network topology has changed or the issue has been resolved. In addition, the techniques enable troubleshooting, including root cause analysis, of user-impacting connectivity issues experienced at any network device within the application session-specific topology over the duration of the particular application session. This includes third-party network devices that may be owned and/or associated with a different entity than NMS 130 such that NMS 130 does not receive, collect, or otherwise have access to network data of the third-party network devices.

Although the techniques of the present disclosure are described in this example as performed by NMS 130, techniques described herein may be performed by any other computing device(s), system(s), and/or server(s), and that the disclosure is not limited in this respect. For example, one or more computing device(s) configured to execute the functionality of the techniques of this disclosure may reside in a dedicated server or be included in any other server in addition to or other than NMS 130, or may be distributed throughout network 100, and may or may not form a part of NMS 130.

Figure 1B:
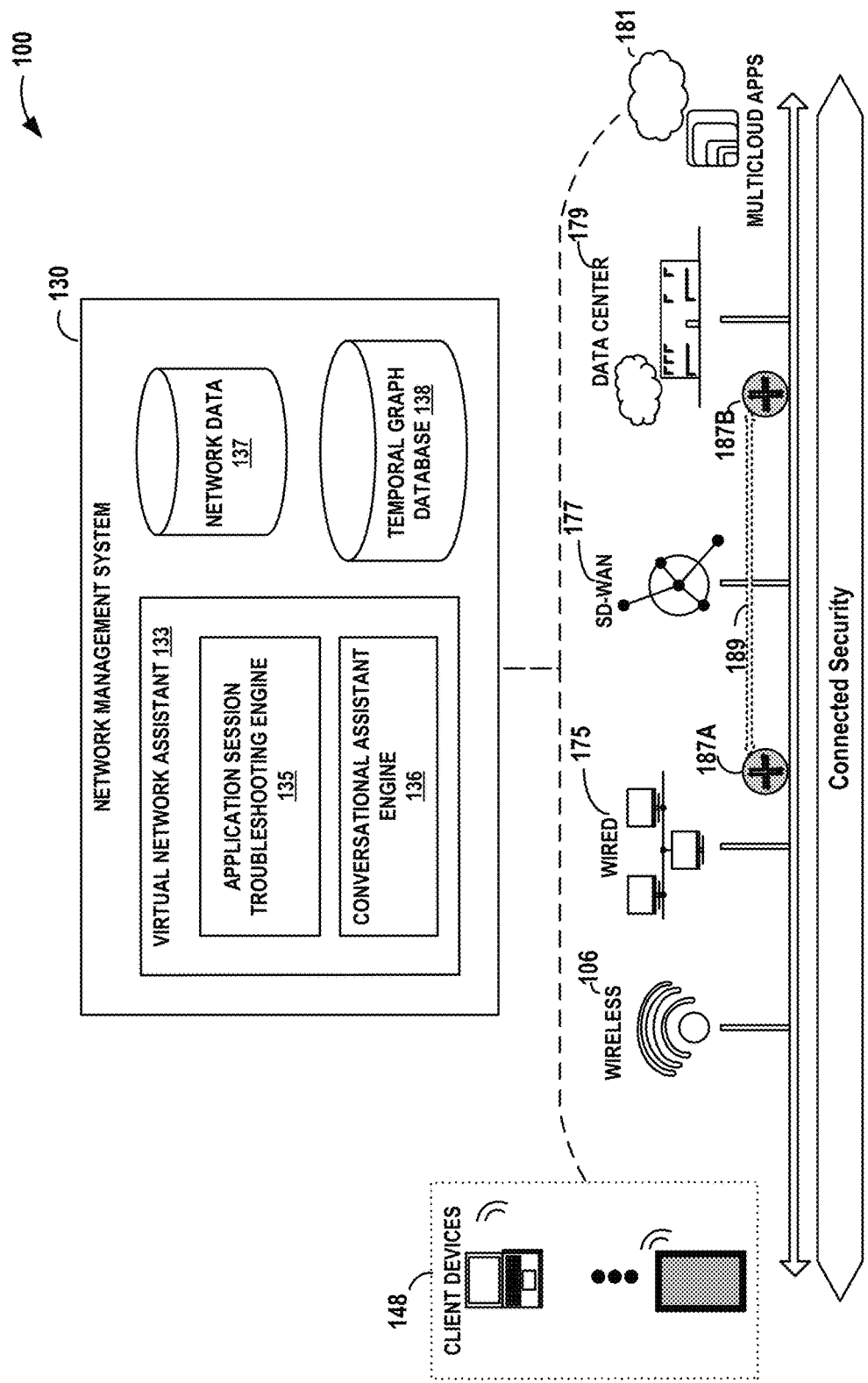
FIG. 1B is a block diagram illustrating further example details of the network system of FIG. 1A.

FIG. 1B is a block diagram illustrating further example details of the network system of FIG. 1A. In this example, FIG. 1B illustrates NMS 130 configured to operate according to an artificial intelligence/machine-learning-based computing platform providing comprehensive automation, insight, and assurance (Wi-Fi Assurance, Wired Assurance and WAN assurance) spanning from "client," e.g., user devices 148 connected to wireless network 106 and wired LAN 175 at the network edge (far left of FIG. 1B), to "cloud," e.g., cloud-based application services 181 that may be hosted by computing resources within data centers 179 (far right of FIG. 1B).

As described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. For example, network management system 130 may be configured to proactively monitor and adaptively configure network 100 so as to provide self-driving capabilities. Moreover, VNA 133 includes a natural language processing engine to provide AI-driven support and troubleshooting, anomaly detection, AI-driven location services, and AI-driven radio frequency (RF) optimization with reinforcement learning.

As illustrated in the example of FIG. 1B, AI-driven NMS 130 also provides configuration management, monitoring and automated oversight of software defined wide-area network (SD-WAN) 177, which operates as an intermediate network communicatively coupling wireless networks 106 and wired LANs 175 to data centers 179 and application services (e.g., multicloud apps) 181. In general, SD-WAN 177 provides seamless, secure, traffic-engineered connectivity between "spoke" routers 187A of edge wired networks 175 hosting wireless networks 106, such as branch or campus networks, to "hub" routers 187B further up the cloud stack toward cloud-based application services 181. SD-WAN 177 often operates and manages an overlay network on an underlying physical Wide-Area Network (WAN), which provides connectivity to geographically separate customer networks. In other words, SD-WAN 177 extends Software-Defined Networking (SDN) capabilities to a WAN and allows network(s) to decouple underlying physical network infrastructure from virtualized network infrastructure and applications such that the networks may be configured and managed in a flexible and scalable manner.

In some examples, underlying routers of SD-WAN 177 may implement a stateful, session-based routing scheme in which the routers 187A, 187B dynamically modify contents of original packet headers sourced by client devices 148 to steer traffic along selected paths, e.g., path 189, toward application services 181 without requiring use of tunnels and/or additional labels. In this way, routers 187A, 187B may be more efficient and scalable for large networks since the use of tunnel-less, session-based routing may enable routers 187A, 187B to achieve considerable network resources by obviating the need to perform encapsulation and decapsulation at tunnel endpoints. Moreover, in some examples, each router 187A, 187B may independently perform path selection and traffic engineering to control packet flows associated with each session without requiring use of a centralized SDN controller for path selection and label distribution. In some examples, routers 187A, 187B implement session-based routing as Secure Vector Routing (SVR), provided by Juniper Networks, Inc.

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; U.S. Pat. No. 10,432,522, entitled "NETWORK PACKET FLOW CONTROLLER WITH EXTENDED SESSION MANAGEMENT," and issued on Oct. 1, 2019; and U.S. Pat. No. 11,075,824, entitled "IN-LINE PERFORMANCE MONITORING," and issued on Jul. 27, 2021, the entire content of each of which is incorporated herein by reference in its entirety.

In some examples, AI-driven NMS 130 may enable intent-based configuration and management of network system 100, including enabling construction, presentation, and execution of intent-driven workflows for configuring and managing devices associated with wireless networks 106, wired LAN networks 175, and/or SD-WAN 177. For example, declarative requirements express a desired configuration of network components without specifying an exact native device configuration and control flow. By utilizing declarative requirements, what should be accomplished may be specified rather than how it should be accomplished. Declarative requirements may be contrasted with imperative instructions that describe the exact device configuration syntax and control flow to achieve the configuration. By utilizing declarative requirements rather than imperative instructions, a user and/or user system is relieved of the burden of determining the exact device configurations required to achieve a desired result of the user/system. For example, it is often difficult and burdensome to specify and manage exact imperative instructions to configure each device of a network when various different types of devices from different vendors are utilized. The types and kinds of devices of the network may dynamically change as new devices are added and device failures occur. Managing various different types of devices from different vendors with different configuration protocols, syntax, and software versions to configure a cohesive network of devices is often difficult to achieve. Thus, by only requiring a user/system to specify declarative requirements that specify a desired result applicable across various different types of devices, management and configuration of the network devices becomes more efficient. Further example details and techniques of an intent-based network management system are described in U.S. Pat. No. 10,756,983, entitled "Intent-based Analytics," and U.S. Pat. No. 10,992,543, entitled "Automatically generating an intent-based network model of an existing computer network," each of which is hereby incorporated by reference.

In accordance with the techniques described in this disclosure, for a particular application session, application session troubleshooting engine 135 of VNA 133 generates a topology based on network data 137 received from a subset of network devices, e.g., client devices 148, AP devices supporting wireless network 106, switches 146 supporting wired LAN 178, and routers 187A, 187B supporting SD-WAN 177, that were involved in the particular application session over a duration of the particular application session. More specifically, application session troubleshooting engine 135 may build the application-session specific topology based on data for the particular application session retrieved from temporal graph database 138 of the network. Temporal graph database 138 is configured to store entity and connectivity information extracted from historical telemetry data collected from the network devices at an application session-level granularity over an extended period of time, e.g., weeks or months. The disclosed techniques enable backward-looking troubleshooting of the particular application session, even if a current network topology has changed after the particular application session or a current application session does not experience the same issues as the particular application session. In this way, VNA 133 provides WAN assurance for application sessions between the client devices 148 connected to wireless network 106 and wired LAN 175 and the cloud-based application services 181 that may be hosted by computing resources within data centers 179.

Figure 2:
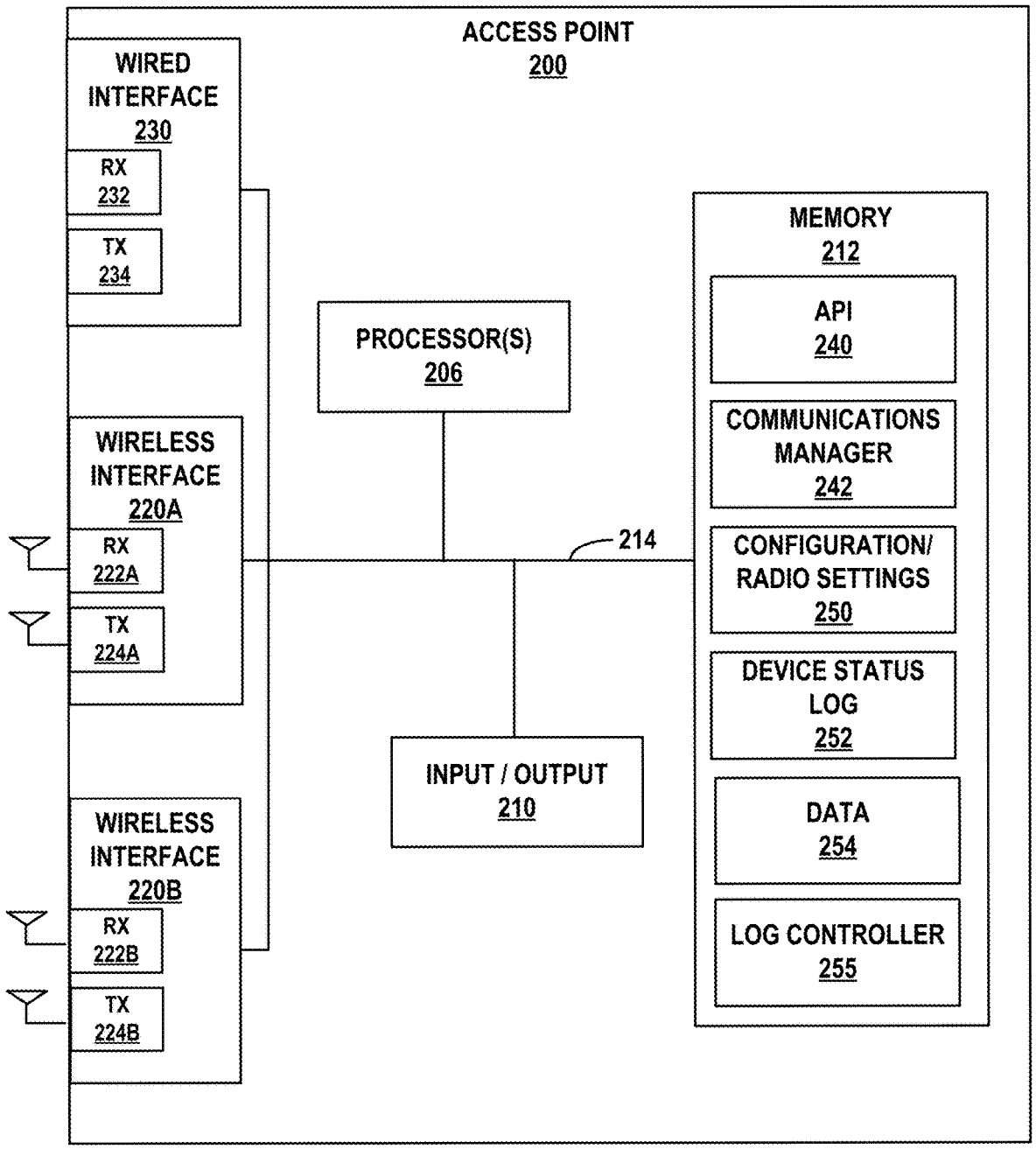
FIG. 2 is a block diagram of an example access point device, in accordance with one or more techniques of this disclosure.

FIG. 2 is a block diagram of an example access point (AP) device 200 configured in accordance with one or more techniques of this disclosure. Example access point 200 shown in FIG. 2 may be used to implement any of APs 142 as shown and described herein with respect to FIG. 1A. Access point 200 may comprise, for example, a Wi-Fi, Bluetooth and/or Bluetooth Low Energy (BLE) base station or any other type of wireless access point.

In the example of FIG. 2, access point 200 includes a wired interface 230, wireless interfaces 220A-220B one or more processor(s) 206, memory 212, and input/output 210, coupled together via a bus 214 over which the various elements may exchange data and information. Wired interface 230 represents a physical network interface and includes a receiver 232 and a transmitter 234 for sending and receiving network communications, e.g., packets. Wired interface 230 couples, either directly or indirectly, access point 200 to a wired network device, such as one of switches 146 of FIG. 1A, within the wired network via a cable, such as an Ethernet cable.

First and second wireless interfaces 220A and 220B represent wireless network interfaces and include receivers 222A and 222B, respectively, each including a receive antenna via which access point 200 may receive wireless signals from wireless communications devices, such as UEs 148 of FIG. 1A. First and second wireless interfaces 220A and 220B further include transmitters 224A and 224B, respectively, each including transmit antennas via which access point 200 may transmit wireless signals to wireless communications devices, such as UEs 148 of FIG. 1A. In some examples, first wireless interface 220A may include a Wi-Fi 802.11 interface (e.g., 2.4 GHz and/or 5 GHz) and second wireless interface 220B may include a Bluetooth interface and/or a Bluetooth Low Energy (BLE) interface.

Processor(s) 206 are programmable hardware-based processors configured to execute software instructions, such as those used to define a software or computer program, stored to a computer-readable storage medium (such as memory 212), such as non-transitory computer-readable mediums including a storage device (e.g., a disk drive, or an optical drive) or a memory (such as Flash memory or RAM) or any other type of volatile or non-volatile memory, that stores instructions to cause the one or more processors 206 to perform the techniques described herein.

Memory 212 includes one or more devices configured to store programming modules and/or data associated with operation of access point 200. For example, memory 212 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 206 to perform the techniques described herein.

In this example, memory 212 stores executable software including an application programming interface (API) 240, a communications manager 242, configuration/radio settings 250, a device status log 252 and data 254. Device status log 252 includes a list of events specific to access point 200. The events may include a log of both normal events and error events such as, for example, memory status, reboot or restart events, crash events, cloud disconnect with self-recovery events, low link speed or link speed flapping events, Ethernet port status, Ethernet interface packet errors, upgrade failure events, firmware upgrade events, configuration changes, etc., as well as a time and date stamp for each event. Log controller 255 determines a logging level for the device based on instructions from NMS 130. Data 254 may store any data used and/or generated by access point 200, including data collected from UEs 148, such as data used to calculate one or more SLE metrics, that is transmitted by access point 200 for cloud-based management of wireless networks 106A by NMS 130.

Input/output (I/O) 210 represents physical hardware components that enable interaction with a user, such as buttons, a display, and the like. Although not shown, memory 212 typically stores executable software for controlling a user interface with respect to input received via I/O 210. Communications manager 242 includes program code that, when executed by processor(s) 206, allow access point 200 to communicate with UEs 148 and/or network(s) 134 via any of interface(s) 230 and/or 220A-220C. Configuration settings 250 include any device settings for access point 200 such as radio settings for each of wireless interface(s)

220A-220C. These settings may be configured manually or may be remotely monitored and managed by NMS 130 to optimize wireless network performance on a periodic (e.g., hourly or daily) basis.

As described herein, AP device 200 may measure and report network data from status log 252 to NMS 130. The network data may comprise event data, telemetry data, and/or other SLE-related data. The network data may include various parameters indicative of the performance and/or status of the wireless network. The parameters may be measured and/or determined by one or more of the UE devices and/or by one or more of the APs in a wireless network. NMS 130 may determine one or more SLE metrics based on the SLE-related data received from the APs in the wireless network and store the SLE metrics as network data 137 (FIG. 1A). NMS 130 may further update temporal graph database 138 (FIG. 1A) of the network to include the telemetry data, or at least entity and connectivity information extracted from the telemetry data, received from the APs in the wireless network over time.

Figure 3:
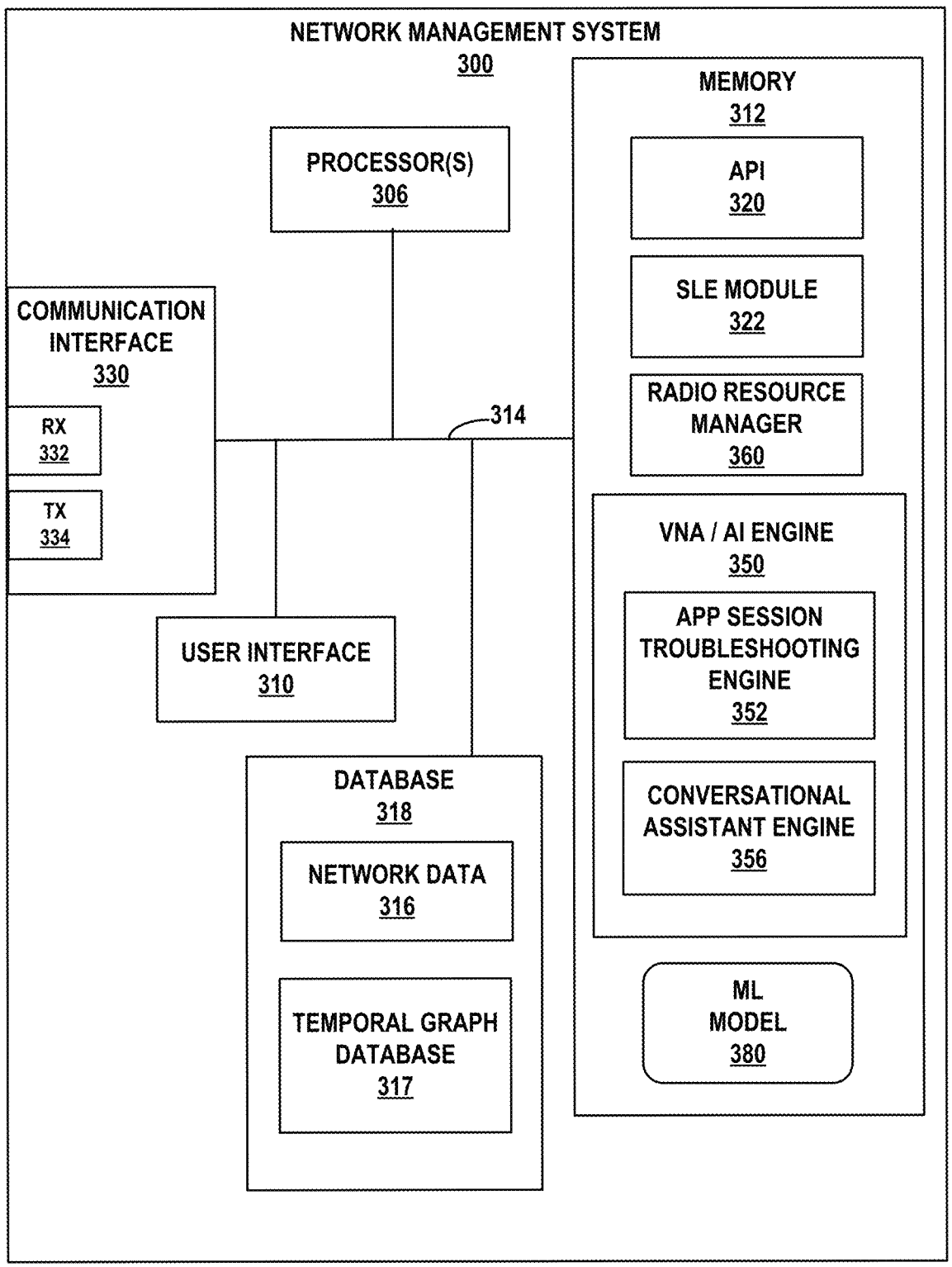
FIG. 3 is a block diagram of an example network management system configured to provide a granular troubleshooting workflow at an application session level using an application session-specific topology from a client device to a cloud-based application server, in accordance with one or more techniques of the disclosure.

FIG. 3 is a block diagram of an example network management system (NMS) 300 configured to provide a granular troubleshooting workflow at an application session level using an application session-specific topology from a client device to a cloud-based application server, in accordance with one or more techniques of the disclosure. NMS 300 may be used to implement, for example, NMS 130 in FIGS. 1A-1B. In such examples, NMS 300 is responsible for monitoring and management of one or more wireless networks 106A-106N at sites 102A-102N, respectively.

NMS 300 includes a communications interface 330, one or more processor(s) 306, a user interface 310, a memory 312, and a database 318. The various elements are coupled together via a bus 314 over which the various elements may exchange data and information. In some examples, NMS 300 receives data from one or more of client devices 148, APs 142, switches 146 and other network nodes within network 134, e.g., routers 187 of FIG. 1B, which may be used to calculate one or more SLE metrics and/or update temporal graph database 317. NMS 300 analyzes this data for cloud-based management of wireless networks 106A-106N. The received data is stored as network data 316 in database 318, and the telemetry data included in the received data, or at least entity and connectivity information extracted from the telemetry data, is stored within temporal graph database 317 in database 318. In some examples, NMS 300 may be part of another server shown in FIG. 1A or a part of any other server.

Processor(s) 306 execute software instructions, such as those used to define a software or computer program, stored to a computer-readable storage medium (such as memory 312), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 330 may include, for example, an Ethernet interface. Communications interface 330 couples NMS 300 to a network and/or the Internet, such as any of network(s) 134 as shown in FIG. 1A, and/or any local area networks.

Communications interface 330 includes a receiver 332 and a transmitter 334 by which NMS 300 receives/transmits data and information to/from any of client devices 148, APs 142, switches 146, servers 110, 116, 122, 128 and/or any other network nodes, devices, or systems forming part of network system 100 such as shown in FIG. 1A. In some scenarios described herein in which network system 100 includes "third-party" network devices that are owned and/or or associated with different entities than NMS 300, NMS 300 does not receive, collect, or otherwise have access to network data from the third-party network devices.

The data and information received by NMS 300 may include, for example, telemetry data, SLE-related data, or event data received from one or more of client device APs 148, APs 142, switches 146, or other network nodes, e.g., routers 187 of FIG. 1B, used by NMS 300 to remotely monitor the performance of wireless networks 106A-106N and application sessions from client device to cloud-based application server. NMS 300 may further transmit data via communications interface 330 to any of network devices such as client devices 148, APs 142, switches 146, other network nodes within network 134, admin device 111 to remotely manage wireless networks 106A-106N and portions of the wired network.

Memory 312 includes one or more devices configured to store programming modules and/or data associated with operation of NMS 300. For example, memory 312 may include a computer-readable storage medium, such as a non-transitory computer-readable medium including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

In this example, memory 312 includes an API 320, an SLE module 322, a virtual network assistant (VNA)/AI engine 350, and a radio resource manager (RRM) 360. In accordance with the disclosed techniques, VNA/AI engine 350 includes application session troubleshooting engine 352 that builds an application-session specific topology for a particular application session based on data for the particular application session retrieved from temporal graph database 317. Application session troubleshooting engine 352, in some examples, applies a ML model 380 to network data 316 and/or temporal graph database 317 to perform troubleshooting of the particular application session by identifying root causes of connectivity issues at one or more of the subset of network devices involved in the particular application session. NMS 300 may also include any other programmed modules, software engines and/or interfaces configured for remote monitoring and management of wireless networks 106A-106N and portions of the wired network, including remote monitoring and management of any of APs 142/200, switches 146, or other network devices, e.g., routers 187 of FIG. 1B.

SLE module 322 enables set up and tracking of thresholds for SLE metrics for each network 106A-106N. SLE module 322 further analyzes SLE-related data collected by APs, such as any of APs 142 from UEs in each wireless network 106A-106N. For example, APs 142A-1 through 142A-N collect SLE-related data from UEs 148A-1 through 148A-N currently connected to wireless network 106A. This data is transmitted to NMS 300, which executes by SLE module 322 to determine one or more SLE metrics for each UE 148A-1 through 148A-N currently connected to wireless network 106A. This data, in addition to any network data collected by one or more APs 142A-1 through 142A-N in wireless network 106A, is transmitted to NMS 300 and stored as, for example, network data 316 in database 318.

RRM engine 360 monitors one or more metrics for each site 102A-102N in order to learn and optimize the RF environment at each site. For example, RRM engine 360 may monitor the coverage and capacity SLE metrics for a wireless network 106 at a site 102 in order to identify potential issues with SLE coverage and/or capacity in the wireless network 106 and to make adjustments to the radio settings of the access points at each site to address the identified issues. For example, RRM engine 360 may determine channel and transmit power distribution across all APs 142 in each network 106A-106N. For example, RRM engine 360 may monitor events, power, channel, bandwidth, and number of clients connected to each AP. RRM engine 360 may further automatically change or update configurations of one or more APs 142 at a site 102 with an aim to improve the coverage and capacity SLE metrics and thus to provide an improved wireless experience for the user.

VNA/AI engine 350 analyzes data received from network devices as well as its own data to identify when undesired to abnormal states are encountered at one of the network devices. For example, VNA/AI engine 350 may identify the root cause of any undesired or abnormal states, e.g., any poor SLE metric(s) indicative of connected issues at one or more network devices. In addition, VNA/AI engine 350 may automatically invoke one or more corrective actions intended to address the identified root cause(s) of one or more poor SLE metrics. Examples of corrective actions that may be automatically invoked by VNA/AI engine 350 may include, but are not limited to, invoking RRM 360 to reboot one or more APs, adjusting/modifying the transmit power of a specific radio in a specific AP, adding SSID configuration to a specific AP, changing channels on an AP or a set of APs, etc. The corrective actions may further include restarting a switch and/or a router, invoking downloading of new software to an AP, switch, or router, etc. These corrective actions are given for example purposes only, and the disclosure is not limited in this respect. If automatic corrective actions are not available or do not adequately resolve the root cause, VNA/AI engine 350 may proactively provide a notification including recommended corrective actions to be taken by IT personnel, e.g., a site or network administrator using admin device 111, to address the network error.

A problem in cloud-based administered wireless networks is how to troubleshoot and improve the user experience at a flow session level for high user-sensitivity applications, e.g., VOIP applications, streaming video applications, gaming applications, or video conference applications. The current industry standard for high user sensitivity applications is to provide an overall score (i.e., a mean opinion score (MOS) having a scale of 1 to 5) of the quality of the voice or video sessions. The quality score of the session is typically presented on its own without additional analysis or troubleshooting to identify a root cause of a low quality score.

In accordance with one or more techniques of this disclosure, VNA/AI engine 350 is configured to provide a granular troubleshooting workflow at the application session level using an application session-specific topology from client to cloud. For a particular application session, application session troubleshooting engine 352 generates a topology of the network devices and connections between the network devices that were involved in the particular application session over a duration of the particular application session. The application-session specific topology is built based on telemetry data received from the network devices, e.g., client devices 148, AP devices 142, switches 146, and other network nodes such as routers 187 of FIG. 1B, over the duration of the particular application session. Application session troubleshooting engine 352 enables visualization of the application session-specific topology including color-coding, icons, or other indicia of connectivity issues within the topology over the duration of the particular application session.

Temporal graph database 317 is configured to store connectivity and entity information of the network, which is extracted from historical telemetry data that NMS 300 collects from client devices 148, APs 142, switches 146, and/or other network nodes within network 134 at an application session-level granularity over an extended period of time, e.g., weeks or months. The connectivity information may represent different kinds of connections, including wireless, wired, and logical links such as peer paths or IPsec tunnels for SD-WAN devices, e.g., routers 187 of SD-WAN 177 from FIG. 1B. The entity information may represent different kinds of network devices, including client devices, AP devices, switches, other network nodes such as routes and gateways, and third-party network devices as well as applications running on the network devices. NMS 300 uses the connectivity and entity information at the application session-level to update temporal graph database 317, where the graph is representative of the network topology at the application session-level over the period of time.

An application session comprises a user session with the application, e.g., a VOIP or video conference call, a streaming video viewing session, or a gaming session. The application session may include multiple application flows (e.g., 10 s to 100 s of application flows) that each comprise a network level flow between network devices (e.g., defined by a 5-tuple) during the application session. For example, during an hour long VOIP call, a client device running the application may connect to multiple different AP devices (e.g., if the client device is moving during the session) and generate multiple application flows of the application session. In addition, each of the AP devices may connect to one or more switches, routers, and/or gateways up to the cloud-based application server, where each new connection may comprise another application flow of the application session.

Application session troubleshooting engine 352 correlates the multiple application flows of the identified application session and uses the application flow data to determine a subset of network devices within the network that were associated with the application session over the duration of the application session. Application session troubleshooting engine 352 then retrieves the connectivity and entity information from temporal graph database 317 for all of the AP devices, switches, routers and/or gateways, and the cloud-based application server to which the client device running the application was connected over the duration of the application session.

Application session troubleshooting engine 352 may build an application-session specific topology for the application session based on the entity and connectivity information for the application session retrieved from temporal graph database 317. In this way, the disclosed techniques enable backward-looking troubleshooting of the application session, even if a current network topology has changed after the particular application session concludes or if a current application session does not experience the same issues as the particular application session.

Application session troubleshooting engine 352 may further enable troubleshooting of the application session by identifying connectivity issues at one or more of a subset of network devices involved with the particular application session over the duration of the particular application session. For example, application session troubleshooting engine 352 analyzes network data 316 of the subset of network devices involved with the particular application session to identify root causes of the connectivity issues at one or more of the subset of network devices involved with the particular application session. More specifically, application session troubleshooting engine 352 may analyze event data included in or derived from network device 316 to determine whether connectivity issues are present. In some scenarios, application session troubleshooting engine 352 may apply at least a portion of network data 316 to ML model 380 to determine root causes of the connectivity issues.

The event data used to identify connectivity issues and root causes of the connectivity issues may be different for each of the different network devices involved with the particular application session. For example, application session troubleshooting engine 352 may analyze application activity event data to identify connectivity issues caused by the application running on a cloud-based application server. Application session troubleshooting engine 352 may analyze pre-connection issues such as DNS, DHCP, and address resolution protocol (ARP) issues to identify connectivity issues caused by the client device 148/400. Application session troubleshooting engine 352 may analyze AP health, radio health, pre-connection issues, RF issues, and/or configuration issues to identify connectivity issues caused by an access point 142/200. Application session troubleshooting engine 352 may analyze switch health, cable issues, missing virtual local area network (VLAN), congestion and/or configuration issues to identify connectivity issues caused by a switch 146. Application session troubleshooting engine 352 may analyze gateway health, WAN link, and/or configuration issues to identify connectivity issues caused by routers or gateways 187A, 187B of SD-WAN 177.

Application session troubleshooting engine 352 may generate data representative of a user interface to provide to a user, e.g., a site or network administrator using admin device 111, visualization of the application session-specific topology including color-coding, icons, or other indicia of connectivity issues within the topology over the duration of the particular application session. In response to user input selecting an icon indicative of a network device identified as having connectivity issues during the particular application session, application session troubleshooting engine 352 may further generate a troubleshooting user interface for the network device or may redirect the user to a customer insight or recommended action user interface specific to the network device. Application session troubleshooting engine 352 may utilize APIs to expose the appropriate data from temporal graph database 317 to the user interface to build and visualize the application session-specific topology for the particular application session.

In addition, application session troubleshooting engine 352 may enable identification of third-party application servers, third-party service provider servers, and other third-party network devices involved with the particular application session to provide a complete topology from client device to the cloud-based application server. For example, application session troubleshooting engine 352 may determine which switches, routers, and/or gateways are connected to the third-party application server, third-party service provider servers, or other third-party network devices based on uplink data (e.g., LLDP advertisements) included in network data 316 received from the switches, routers, and/or gateways during the particular application session. Application session troubleshooting engine 352 may then determine entity ID data (e.g., an IP address or interface address) of the third-party network devices. In some examples, application session troubleshooting engine 352 may have some integration with APM vendors to retrieve insights data for online application services and/or service providers via APIs in order to determine whether the application services and/or service providers are down or experiencing issues.

In some examples, ML model 380 may comprise a supervised ML model that is trained, using training data comprising pre-collected, labeled network data received from network devices (e.g., client devices, APs, switches and/or other network nodes), to identify root causes of connectivity issues at one or more network device of the subset of network devices involved in a particular application session. The supervised ML model may comprise one of a logistical regression, naïve Bayesian, support vector machine (SVM), or the like. In other examples, ML model 380 may comprise an unsupervised ML model. Although not shown in FIG. 3, in some examples, database 318 may store the training data and VNA/AI engine 350 or a dedicated training module may be configured to train ML model 380 based on the training data to determine appropriate weights across the one or more features of the training data.

In the case of a connectivity issue being detected at one or more of the network device involved in the application session, application session troubleshooting engine 352 generates data representative of a user interface to provide to a user, e.g., a site or network administrator using admin device 111, visualization of the application session-specific topology including color-coding, icons, or other indicia of the connectivity issue within the topology over the duration of the particular application session. In some examples, VNA/AI engine 350 may determine a recommended action based on the detected connectivity issue and/or a root cause determined for the detected connectivity issue. VNA/AI engine 350 may output a notification of the connectivity issue and/or the root cause of the connectivity issue via one or more of user interface 310, API 320, webhooks, or email via communication interface 330 for display on admin device 111 of the administrator.

In some examples, the site or network administrator, e.g., using admin device 111, may initiate the topology visualization and troubleshooting of the particular application session via a conversational assistant engine 356. Conversational assistant engine 356 may be configured to process user inputs, such as text strings, and generate responses. In some examples, conversational assistant engine 356 may include one or more natural language processors configured to process the user inputs. Conversational assistant engine 356 may be configured to conduct a chat conversation that simulates a way a human would behave as a conversation partner, which may help to simplify and/or improve a satisfaction of an administrator monitoring and controlling a network.

In accordance with one or more techniques of the disclosure, conversational assistant engine 356 may generate a conversational assistant configured to receive user input. In a specific use case, the admin, via admin device 111, may enter a query for a particular network device and/or a particular application session into conversational assistant engine 356. Conversational assistant engine 356 may provide a platform in which to present the application session-specific topology to the admin and with which the admin may interact with the application session-specific topology.

For instance, the conversational assistant may receive a string indicating the application, a duration, and/or a device identifier (e.g., "troubleshoot teams call from client device A," where "teams call" indicates the application and "client device A" comprises a client device identifier; or "how is DC84AP544 during last 7 days," where "DC84AP544" comprises an AP device identifier and "7 days," indicates a duration). In some instances, the conversational assistant may receive a string indicating the application, a duration, and/or a user identifier (e.g., "troubleshoot user B teams call," where "user B" is a user of a client device and "teams call" indicates the application). Conversational assistant engine 356 may determine the particular network device of the plurality of network devices based on the user input, and determine one or more application sessions in which the particular network device was involved. Conversational assistant engine 356 may automatically filter the application sessions of the particular network device based on, for example, the indicated application and/or the indicated duration if provided in the user input to the conversational assistant. In one scenario where additional session identifying information is not included in the user input, conversational assistant engine 356 may identify all application sessions of the particular network device within a default duration, e.g., today or last 7 days. In another scenario where additional session identifying information is not included in the user input, conversational assistant engine 356 may filter out the high quality application sessions to identify one or more application sessions of the particular network device that experienced connectivity issues most recently or within the default duration.

Upon identifying the particular application session, application session troubleshooting engine 352 builds the application-session specific topology for the particular application session based on data for the particular application session retrieved from temporal graph database 317. Application session troubleshooting engine 352 generates data representative of the application session-specific topology for presentation within the conversational assistant to the administrator using admin device 111. The visualization includes color-coding, icons, or other indicia of connectivity issues within the topology over the duration of the particular application session, as determined by application session troubleshooting engine 352 based on the temporal data stored as network data 316 and/or temporal graph database 317. In this example, the administrator using admin device 111 may interact with the application session-specific topology presented within the conversational assistant to select an icon indicative of a network device in the topology identified as having connectivity issues during the particular application session. In response to the selection of the network device, application session troubleshooting engine 352 may further generate a troubleshooting user interface for the network device for presentation within the conversational assistant. Alternatively, application session troubleshooting engine 352 may redirect the user to a customer insight or recommended action user interface specific to the network device.

The techniques of this disclosure provide one or more technical advantages and practical applications. For example, the techniques enable determination of an application session-specific topology from client to cloud to enable troubleshooting of a particular application session based on the topology and connectivity issues associated with the particular application session over a duration of the particular application session. The techniques enable backward-looking troubleshooting to determine what caused a poor quality session, even if the current network topology has changed or the issue has been resolved. In addition, the techniques enable troubleshooting, including root cause analysis, of user-impacting connectivity issues experienced at any network device within the application session-specific topology over the duration of the particular application session. This includes third-party network devices that may be owned and/or associated with a different entity than NMS 130 such that NMS 130 does not receive, collect, or otherwise have access to the network data of the third-party network devices.

Although the techniques of the present disclosure are described in this example as performed by NMS 130, techniques described herein may be performed by any other computing device(s), system(s), and/or server(s), and that the disclosure is not limited in this respect. For example, one or more computing device(s) configured to execute the functionality of the techniques of this disclosure may reside in a dedicated server or be included in any other server in addition to or other than NMS 130, or may be distributed throughout network 100, and may or may not form a part of NMS 130.

Figure 4:
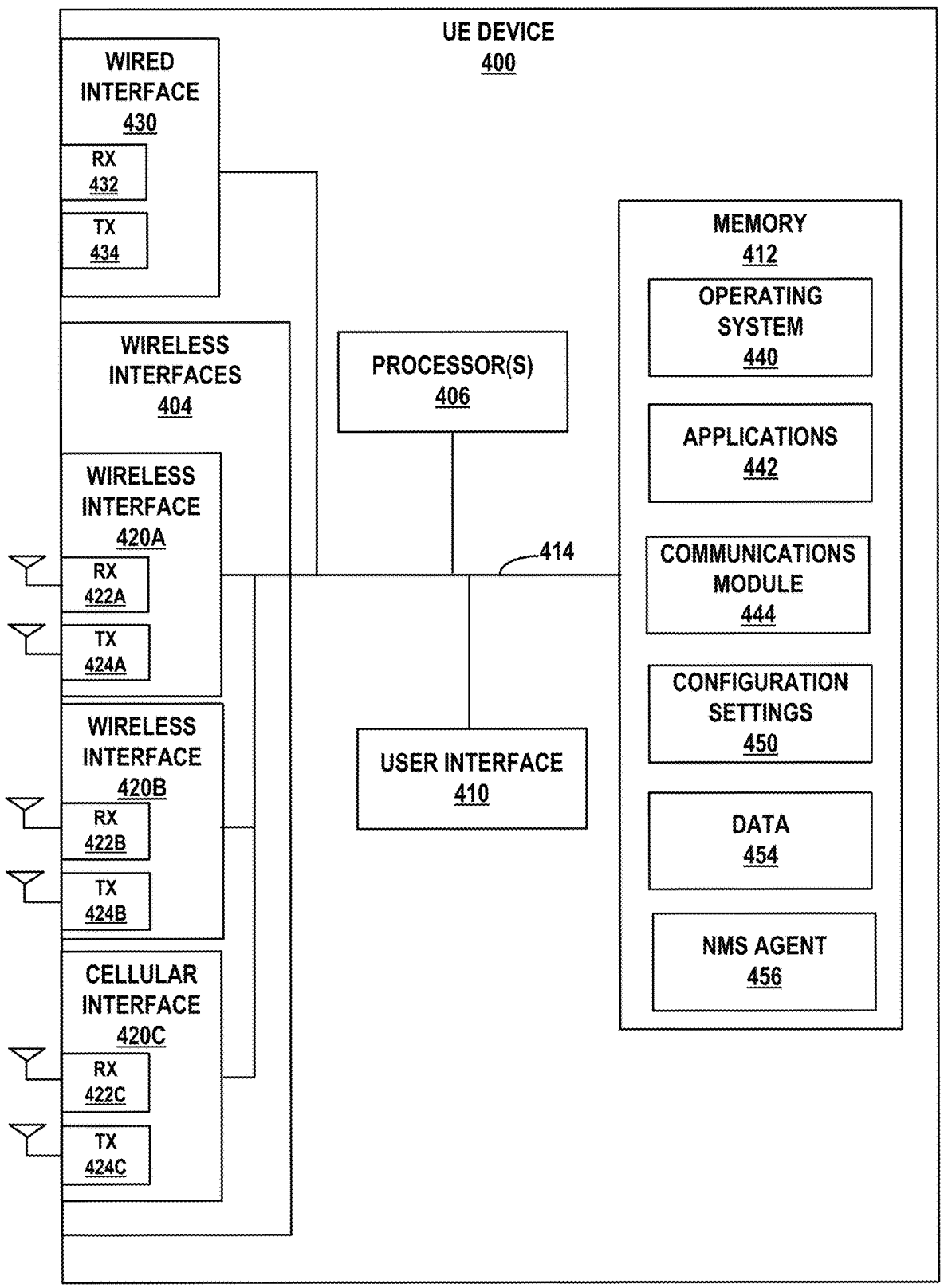
FIG. 4 is a block diagram of an example user equipment device, in accordance with one or more techniques of this disclosure.

FIG. 4 shows an example user equipment (UE) device 400. Example UE device 400 shown in FIG. 4 may be used to implement any of UEs 148 as shown and described herein with respect to FIG. 1A. UE device 400 may include any type of wireless client device, and the disclosure is not limited in this respect. For example, UE device 400 may include a mobile device such as a smart phone, tablet or laptop computer, a personal digital assistant (PDA), a wireless terminal, a smart watch, a smart ring, or any other type of mobile or wearable device. In accordance with techniques described in this disclosure, UE 400 may also include a wired client-side device, e.g., an IoT device such as a printer, a security sensor or device, an environmental sensor, or any other device connected to the wired network and configured to communicate over one or more wireless networks.

UE device 400 includes a wired interface 430, wireless interfaces 420A-420C, one or more processor(s) 406, memory 412, and a user interface 410. The various elements are coupled together via a bus 414 over which the various elements may exchange data and information. Wired interface 430 represents a physical network interface and includes a receiver 432 and a transmitter 434. Wired interface 430 may be used, if desired, to couple, either directly or indirectly, UE 400 to a wired network device, such as one of switches 146 of FIG. 1A, within the wired network via a cable, such as one of Ethernet cables 144 of FIG. 1A.

First, second and third wireless interfaces 420A, 420B, and 420C include receivers 422A, 422B, and 422C, respectively, each including a receive antenna via which UE 400 may receive wireless signals from wireless communications devices, such as APs 142 of FIG. 1A, AP 200 of FIG. 2, other UEs 148, or other devices configured for wireless communication. First, second, and third wireless interfaces 420A, 420B, and 420C further include transmitters 424A, 424B, and 424C, respectively, each including transmit antennas via which UE 400 may transmit wireless signals to wireless communications devices, such as APs 142 of FIG. 1A, AP 200 of FIG. 2, other UEs 148 and/or other devices configured for wireless communication. In some examples, first wireless interface 420A may include a Wi-Fi 802.11 interface (e.g., 2.4 GHz and/or 5 GHz) and second wireless interface 420B may include a Bluetooth interface and/or a Bluetooth Low Energy interface. Third wireless interface 420C may include, for example, a cellular interface through which UE device 400 may connect to a cellular network.

Processor(s) 406 execute software instructions, such as those used to define a software or computer program, stored to a computer-readable storage medium (such as memory 412), such as non-transitory computer-readable mediums including a storage device (e.g., a disk drive, or an optical drive) or a memory (such as Flash memory or RAM) or any other type of volatile or non-volatile memory, that stores instructions to cause the one or more processors 406 to perform the techniques described herein.

Memory 412 includes one or more devices configured to store programming modules and/or data associated with operation of UE 400. For example, memory 412 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 406 to perform the techniques described herein.

In this example, memory 412 includes an operating system 440, applications 442, a communications module 444, configuration settings 450, and data 454. Communications module 444 includes program code that, when executed by processor(s) 406, enables UE 400 to communicate using any of wired interface(s) 430, wireless interfaces 420A-420B and/or cellular interface 450C. Configuration settings 450 include any device settings for UE 400 settings for each of wireless interface(s) 420A-420B and/or cellular interface 420C.

Data 454 may include, for example, a status/error log including a list of events specific to UE 400. The events may include a log of both normal events and error events according to a logging level based on instructions from NMS 130. Data 454 may include any data used and/or generated by UE 400, such as data used to calculate one or more SLE metrics or identify relevant behavior data, that is collected by UE 400 and either transmitted directly to NMS 130 or transmitted to any of APs 142 in a wireless network 106 for further transmission to NMS 130.

As described herein, UE 400 may measure and report network data from data 454 to NMS 130. The network data may comprise event data, telemetry data, and/or other SLE-related data. The network data may include various parameters indicative of the performance and/or status of the wireless network. NMS 130 may determine one or more SLE metrics and store the SLE metrics as network data 137 (FIG. 1A) based on the SLE-related data received from the UEs or client devices in the wireless network. NMS 130 may further update temporal graph database 138 (FIG. 1A) of the network to include the telemetry data, or at least entity and connectivity information extracted from the telemetry data, received from the UEs or client devices in the wireless network over time.

NMS agent 456 is a software agent of NMS 130 that is installed on UE 400. In some examples, NMS agent 456 can be implemented as a software application running on UE 400. NMS agent 456 collects information including detailed client-device properties from UE 400, including insight into UE 400 roaming behaviors. The information provides insight into client roaming algorithms, because roaming is a client device decision. In some examples, NMS agent 456 may display the client-device properties on UE 400. NMS agent 456 sends the client device properties to NMS 130, via an AP device to which UE 400 is connected. NMS agent 456 can be integrated into a custom application or as part of location application. NMS agent 456 may be configured to recognize device connection types (e.g., cellular or Wi-Fi), along with the corresponding signal strength. For example, NMS agent 456 recognizes access point connections and their corresponding signal strengths. NMS agent 456 can store information specifying the APs recognized by UE 400 as well as their corresponding signal strengths. NMS agent 456 or other element of UE 400 also collects information about which APs the UE 400 connected with, which also indicates which APs the UE 400 did not connect with. NMS agent 456 of UE 400 sends this information to NMS 130 via its connected AP. In this manner, UE 400 sends information about not only the AP that UE 400 connected with, but also information about other APs that UE 400 recognized and did not connect with, and their signal strengths. The AP in turn forwards this information to the NMS, including the information about other APs the UE 400 recognized besides itself. This additional level of granularity enables NMS 130, and ultimately network administrators, to better determine the Wi-Fi experience directly from the client device's perspective.

In some examples, NMS agent 456 further enriches the client device data leveraged in service levels. For example, NMS agent 456 may go beyond basic fingerprinting to provide supplemental details into properties such as device type, manufacturer, and different versions of operating systems. In the detailed client properties, the NMS 130 can display the Radio Hardware and Firmware information of UE 400 received from NMS client agent 456. The more details the NMS agent 456 can draw out, the better the VNA/AI engine gets at advanced device classification. The VNA/AI engine of the NMS 130 continually learns and becomes more accurate in its ability to distinguish between device-specific issues or broad device issues, such as specifically identifying that a particular OS version is affecting certain clients.

In some examples, NMS agent 456 may cause user interface 410 to display a prompt that prompts an end user of UE 400 to enable location permissions before NMS agent 456 is able to report the device's location, client information, and network connection data to the NMS. NMS agent 456 will then start reporting connection data to the NMS along with location data. In this manner, the end user of the client device can control whether the NMS agent 456 is enabled to report client device information to the NMS.

Figure 5:
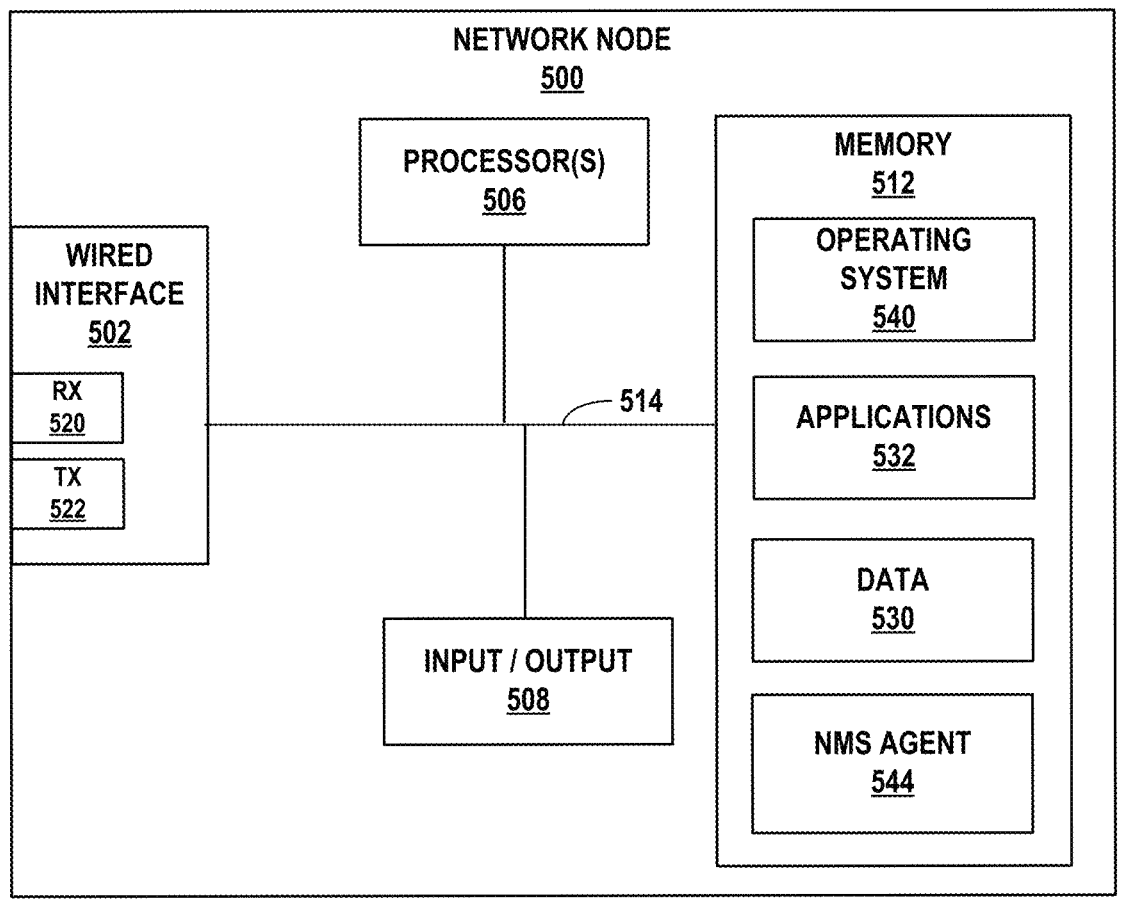
FIG. 5 is a block diagram of an example network node, such as a router or switch, in accordance with one or more techniques of this disclosure.

FIG. 5 is a block diagram illustrating an example network node 500 configured according to the techniques described herein. In one or more examples, the network node 500 implements a device or a server attached to the network 134 of FIG. 1A, e.g., switches 146, AAA server 110, DHCP server 116, DNS server 122, web servers 128, etc., or another network device supporting one or more of wireless network 106, wired LAN 175, or SD-WAN 177, or data center 179 of FIG. 1B, e.g., routers 187.

In this example, network node 500 includes a wired interface 502, e.g., an Ethernet interface, one or more processor(s) 506, input/output 508, e.g., display, buttons, keyboard, keypad, touch screen, mouse, etc., and a memory 512 coupled together via a bus 514 over which the various elements may interchange data and information. Wired interface 502 couples the network node 500 to a network, such as an enterprise network. Though only one interface is shown by way of example, network nodes may, and usually do, have multiple communication interfaces and/or multiple communication interface ports. Wired interface 502 includes a receiver 520 and a transmitter 522.

Memory 512 stores executable software applications 532, operating system 540 and data 530. Data 530 may include a system log and/or an error log that stores event data, including behavior data, for network node 500. In examples where network node 500 comprises a "third-party" network device, the same entity does not own or have access to both the APs or wired client-side devices and network node 500.

As such, in the example where network node 500 is a third-party network device, NMS 130 does not receive, collect, or otherwise have access to the network data from network node 500.

In examples where network node 500 comprises a server, network node 500 may receive data and information, e.g., including operation related information, e.g., registration request, AAA services, DHCP requests, Simple Notification Service (SNS) look-ups, and Web page requests via receiver 520, and send data and information, e.g., including configuration information, authentication information, web page data, etc. via transmitter 522.

In examples where network node 500 comprises a wired network device, network node 500 may be connected via wired interface 502 to one or more APs or other wired client-side devices, e.g., IoT devices, within a wired network edge. For example, network node 500 may include multiple wired interfaces 502 and/or wired interface 502 may include multiple physical ports to connect to multiple APs or the other wired-client-side devices within a site via respective Ethernet cables. In some examples, each of the APs or other wired client-side devices connected to network node 500 may access the wired network via wired interface 502 of network node 500. In some examples, one or more of the APs or other wired client-side devices connected to network node 500 may each draw power from network node 500 via the respective Ethernet cable and a Power over Ethernet (PoE) port of wired interface 502.

In examples where network node 500 comprises a session-based router that employs a stateful, session-based routing scheme, network node 500 may be configured to independently perform path selection and traffic engineering. The use of session-based routing may enable network node 500 to eschew the use of a centralized controller, such as an SDN controller, to perform path selection and traffic engineering, and eschew the use of tunnels. In some examples, network node 500 may implement session-based routing as Secure Vector Routing (SVR), provided by Juniper Networks, Inc. In the case where network node 500 comprises a session-based router operating as a network gateway for a site of an enterprise network (e.g., router 187A of FIG. 1B), network node 500 may establish multiple peer paths (e.g., logical path 189 of FIG. 1B) over an underlying physical WAN (e.g., SD-WAN 177 of FIG. 1B) with one or more other session-based routers operating as network gateways for other sites of the enterprise network (e.g., router 187B of FIG. 1B). Network node 500, operating as a session-based router, may collect data at a peer path level, and report the peer path data to NMS 130.

In examples where network node 500 comprises a packet-based router, network node 500 may employ a packet- or flow-based routing scheme to forward packets according to defined network paths, e.g., established by a centralized controller that performs path selection and traffic engineering. In the case where network node 500 comprises a packet-based router operating as a network gateway for a site of an enterprise network (e.g., router 187A of FIG. 1B), network node 500 may establish multiple tunnels (e.g., logical path 189 of FIG. 1B) over an underlying physical WAN (e.g., SD-WAN 177 of FIG. 1B) with one or more other packet-based routers operating as network gateways for other sites of the enterprise network (e.g., router 187B of FIG. 1B). Network node 500, operating as a packet-based router, may collect data at a tunnel level, and the tunnel data may be retrieved by NMS 130 via an API or an open configuration protocol or the tunnel data may be reported to NMS 130 by NMS agent 544 or other module running on network node 500.

The data collected and reported by network node 500 may include periodically-reported data and event-driven data. Network node 500 is configured to collect logical path statistics via bidirectional forwarding detection (BFD) probing and data extracted from messages and/or counters at the logical path (e.g., peer path or tunnel) level. In some examples, network node 500 is configured to collect statistics and/or sample other data according to a first periodic interval, e.g., every 3 seconds, every 5 seconds, etc. Network node 500 may store the collected and sampled data as path data, e.g., in a buffer. In some examples, NMS agent 544 may periodically create a package of the statistical data according to a second periodic interval, e.g., every 3 minutes. The collected and sampled data periodically reported in the package of statistical data may be referred to herein as "oc-stats."

In some examples, the package of statistical data may also include details about clients connected to network node 500 and the associated client sessions. NMS agent 544 may then report the package of statistical data to NMS 130 in the cloud. In other examples, NMS 130 may request, retrieve, or otherwise receive the package of statistical data from network node 500 via an API, an open configuration protocol, or another of communication protocols. The package of statistical data created by NMS agent 544 or another module of network node 500 may include a header identifying network node 500 and the statistics and data samples for each of the logical paths from network node 500. In still other examples, NMS agent 544 reports event data to NMS 130 in the cloud in response to the occurrence of certain events at network node 500 as the events happen. The event-driven data may be referred to herein as "oc-events."

Figure 6A:
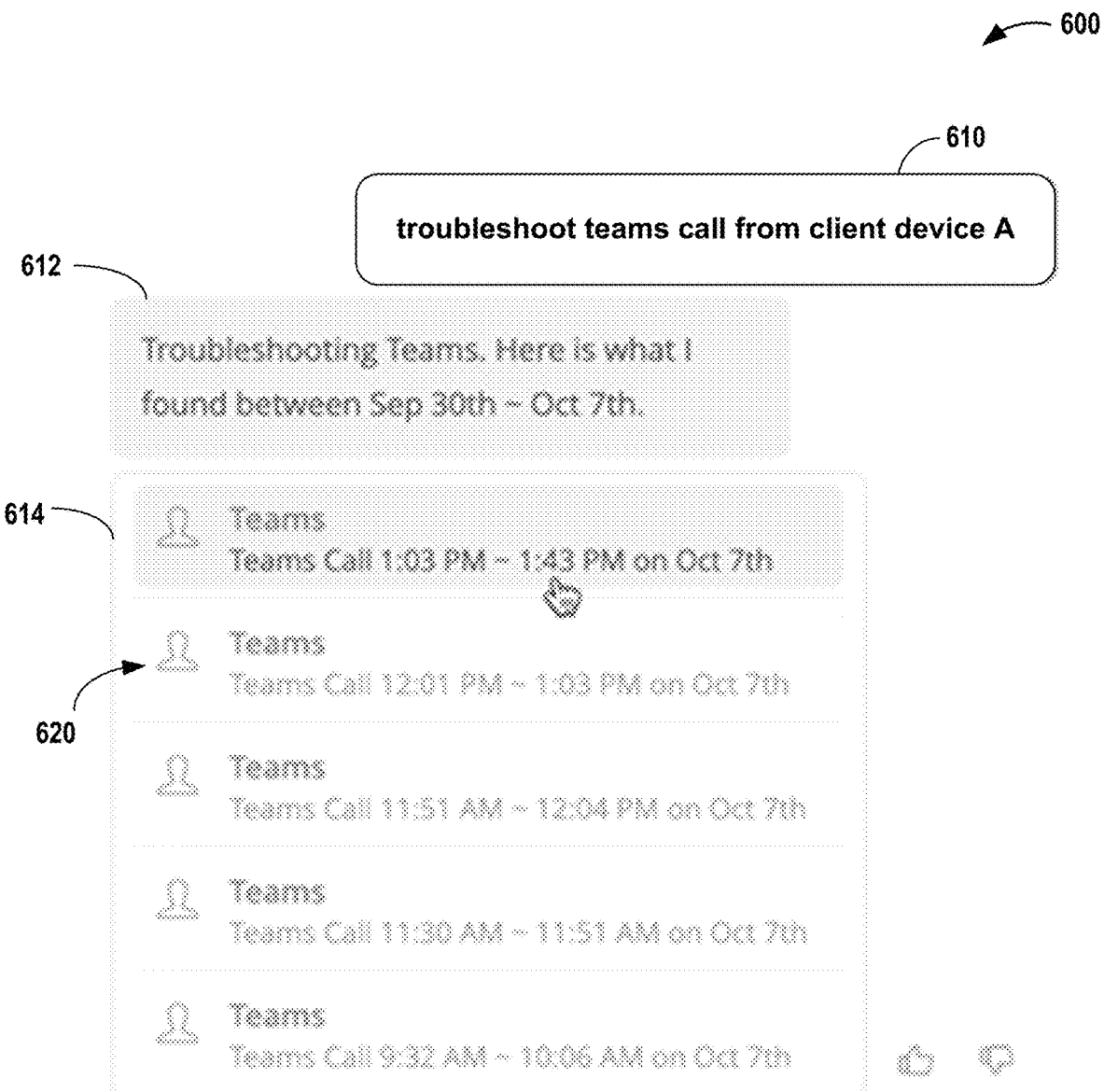
FIGS. 6A-6C illustrate example user interfaces of the network management system for visualization of an application session-specific topology and an associated troubleshooting workflow for a network gateway device involved in the application session.
Figure 6B:
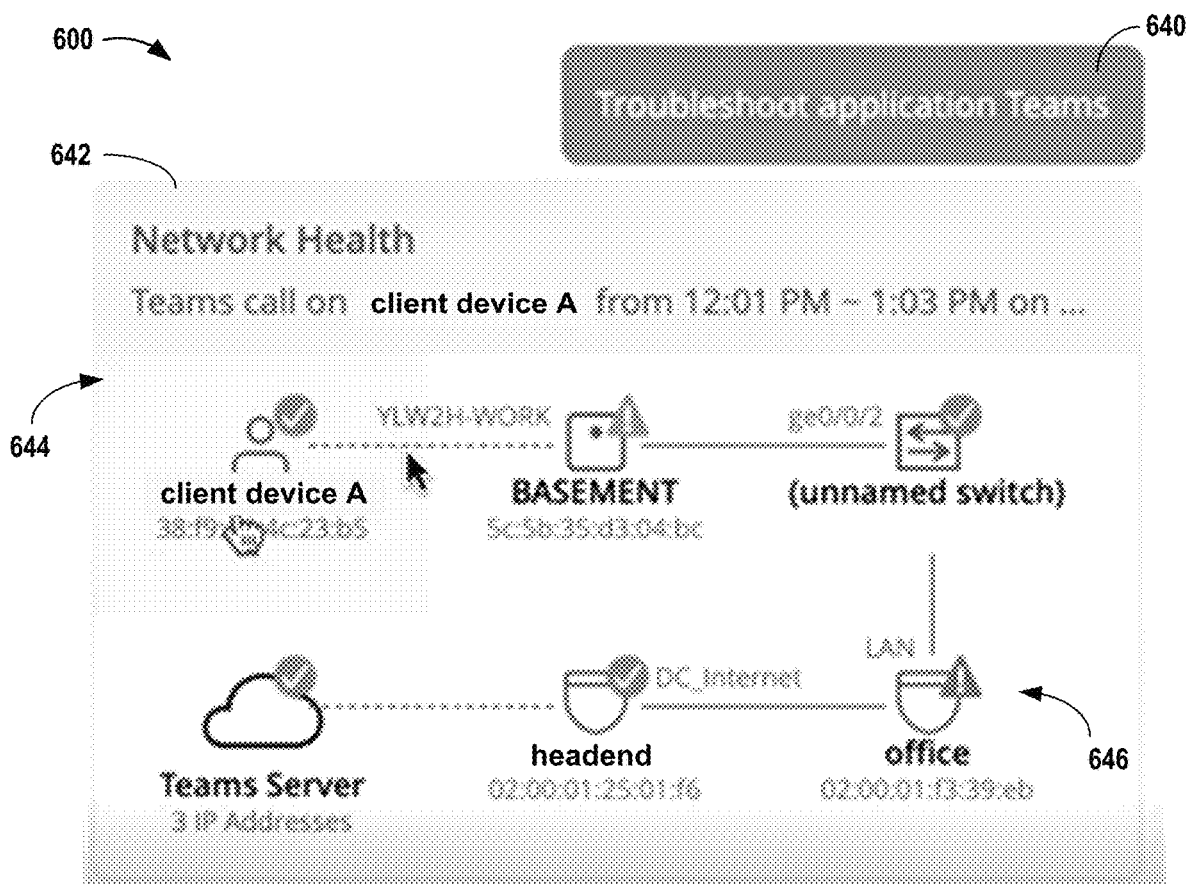
Figure 6C:
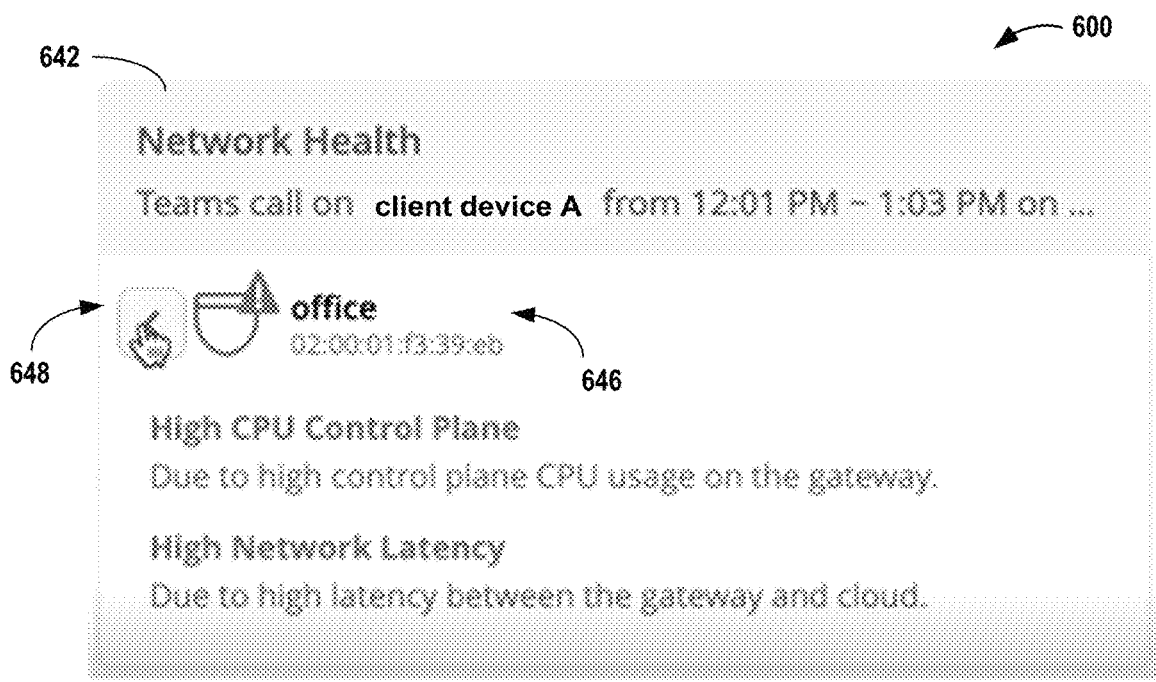

FIGS. 6A-6C illustrate example user interfaces of NMS 130/300 for visualization of an application session-specific topology and an associated troubleshooting workflow for a network gateway device involved in the application session.

FIG. 6A illustrates an example conversational assistant user interface 600 including a query or user input 610 from an administrator via admin device 111 initiating topology visualization and troubleshooting of a particular application session, and a response or output 612, 614 generated by conversational assistant engine 136, 356. In the example of FIG. 6A, the user input 610 to conversational assistant user interface 600 comprises a string indicating the application and a device identifier (i.e., "troubleshoot teams call from client device A," where "teams call" indicates the application and "client device A" comprises a client device identifier). Conversational assistant engine 136, 356 may automatically filter the application sessions of the particular network device based on the indicated application (in this example Microsoft Teams®) and a default duration (in this example the last 7 days). The response 612 within conversational assistant user interface 600 comprises a string that states "Troubleshooting Teams. Here is what I found between Septmber $30^{th}$~October $7^{th}$." In addition, conversational assistant user interface 600 presents output 614 as a list of all application sessions (in this example Teams calls) of the particular network device during the default duration. For example, application session 620 comprises a Teams call of the particular network device (in this example client device A) from 12:01 PM~1:03 PM on October $7^{th}$.

FIG. 6B illustrates a further example of conversational assistant user interface 600 including user input 640 (in this example "Troubleshot application Teams") based on a selection of application session 620 included in output 614 from FIG. 6A, and network health output 642 for application session 620 (in this example "Teams call on client device A from 12:01 PM~1:03 PM on October 7$^{th}$.") In the illustrated example of FIG. 6B, as part of network health output 642, conversational assistant user interface 600 presents application session-specific topology 644 generated by conversational assistant engine 136, 356 for the selected application session 620.

Application session-specific topology 644 includes a client device ("client device A") running the application, an AP device ("BASEMENT"), a third-party switch ("unnamed switch"), a spoke router ("office"), a hub router ("headend"), and the cloud-based application server ("Teams server") and further provides addresses for each of the network devices in the application session-specific topology. In addition, as shown in FIG. 6B, application session-specific topology 644 includes indicia of performance or connectivity health for each of the network devices. For example, green circles with checks included on one or more of the network devices (e.g., client device ("client device A"), third-party switch ("unnamed switch"), hub router ("headend"), and application server ("Teams server")) may indicate no known issues at those network devices during the application session. Orange or red triangles with exclamation points included on one or more network devices (e.g., AP device ("BASEMENT") and spoke router ("office") 646) may respectively indicate a moderate or severe connectivity issue at those application devices during the application session.

FIG. 6C illustrates a further example of conversational assistant user interface 600 including network health output 642 for application session 620 (in this example "Teams call on client device A from 12:01 PM~1:03 PM on October 7$^{th}$") including troubleshooting user interface 648 based on a selection of spoke router ("office") 646 within application session-specific topology 644 from FIG. 6B. Troubleshooting user interface 648 for the spoke router 646 involved with application session 620 includes root causes of the connectivity issues at spoke router 646 as determined by application session troubleshooting engine 135/352. In the illustrated example of FIG. 6C, troubleshooting user interface 648 indicates a first root cause as "High CPU Control Plane" due to high control plane CPU usage on the gateway (spoke router ("office") 646), and a second root cause as "High Network Latency" due to high latency between the gateway (spoke router ("office") 646) and the cloud (application server ("Teams server")).

Figure 7B:
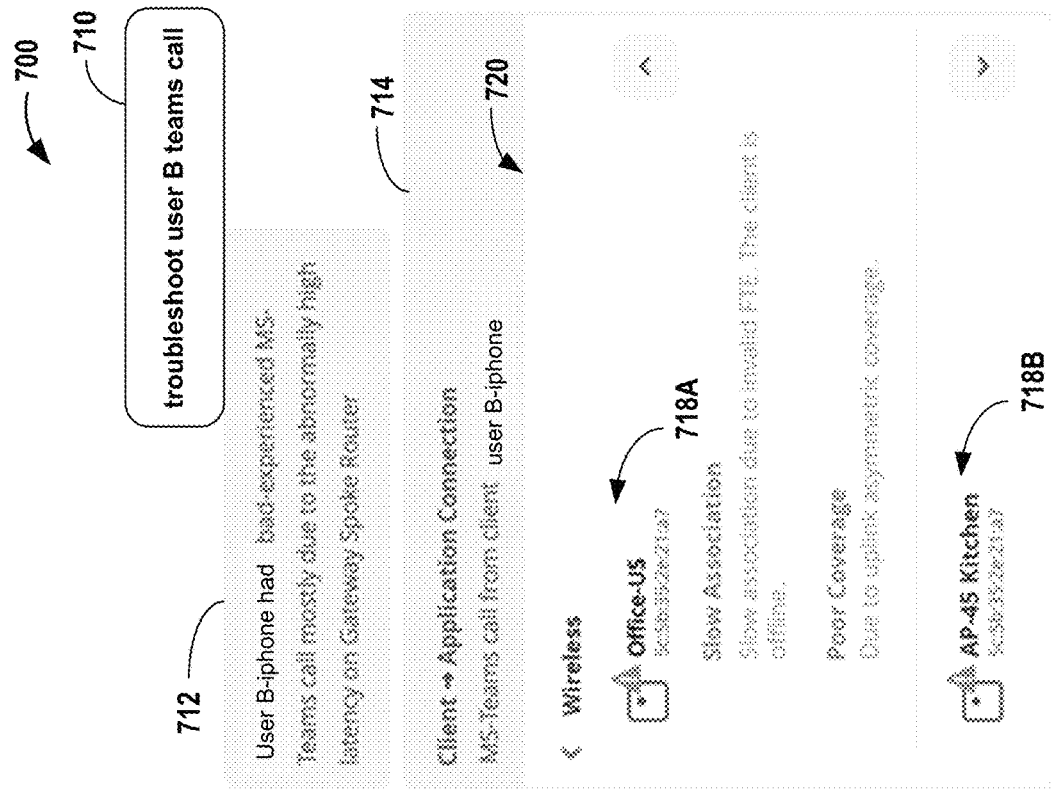
FIGS. 7A-7B illustrate example user interfaces of the network management system for visualization of an application session-specific topology and an associated troubleshooting workflow for AP devices involved in the application session.
Figure 7A:
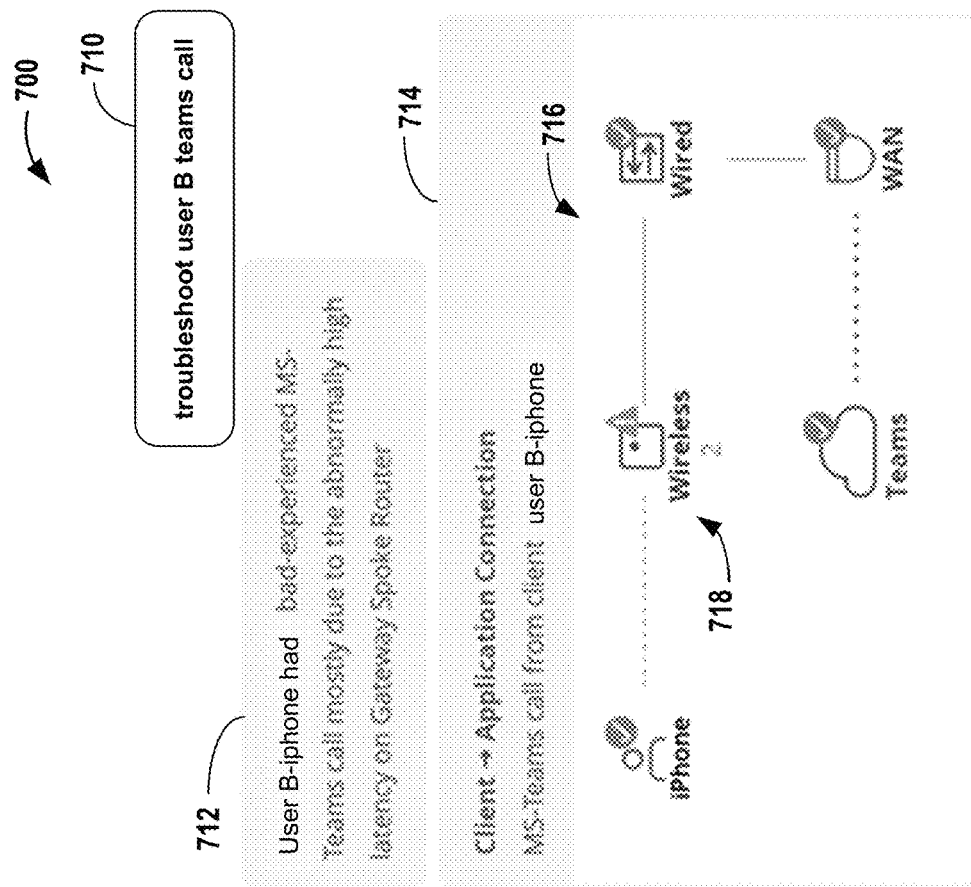

FIGS. 7A-7B illustrate example user interfaces of NMS 130/300 for visualization of an application session-specific topology and an associated troubleshooting workflow for AP devices involved in the application session.

FIG. 7A illustrates an example conversational assistant user interface 700 including a query or user input 710 from an administrator via admin device 111 initiating topology visualization and troubleshooting of a particular application session, and a response or output 712, 714 generated by conversational assistant engine 136, 356. In the example of FIG. 7A, the user input 710 to conversational assistant user interface 700 comprises a string indicating the application and a user identifier (i.e., "troubleshoot user B teams call," where "user B" is a user of a client device and "teams call" indicates the application). Conversational assistant engine 136, 356 may automatically filter the application sessions of one or more network devices associated with the user based on the indicated application (in this example Microsoft Teams®) to identify one or more application sessions of a network device associated with the user that experienced connectivity issues most recently. The response 712 within conversational assistant user interface 700 comprises a string that states, "User B-iphone had bad-experienced MS-Teams call mostly due to the abnormally high latency on Gateway Spoke Router."

In addition, conversational assistant user interface 700 presents output 714 for the identified application session (in this example "MS-Teams call from client user B-iphone.") In the illustrated example of FIG. 7A, as part of output 714, conversational assistant user interface 700 presents application session-specific topology 716 generated by conversational assistant engine 136, 356 for the identified application session. Application session-specific topology 716 includes a client device ("iPhone") running the application, two AP devices ("Wireless") 718, a switch ("Wired"), a gateway ("WAN"), and the cloud-based application server ("Teams"). In addition, as shown in FIG. 7A, application session-specific topology 716 includes indicia of performance or connectivity health for each of the network devices. For example, green circles with checks included on one or more of the network devices (e.g., client device ("iPhone"), switch ("Wired"), gateway ("WAN"), and application server ("Teams")) may indicate no known issues at those network devices during the application session. Orange triangles with exclamation points included on one or more network devices (e.g., AP devices ("Wireless") 718) may respectively indicate a moderate connectivity issue at those application devices during the application session.

FIG. 7B illustrates a further example of conversational assistant user interface 700 including output 714 for the identified application session (in this example "MS-Teams call from client user B-iphone") including troubleshooting user interface 720 based on a selection of AP devices ("Wireless") 718 within application session-specific topology 716 from FIG. 7A. Troubleshooting user interface 720 for a first AP device ("Office-US") 718A involved with the identified application session includes root causes of the connectivity issues at first AP device 718A as determined by application session troubleshooting engine 135/352. In the illustrated example of FIG. 7B, troubleshooting user interface 720 for first AP router 718A indicates a first root cause as "Slow Association" due to invalid FTE as the client (first AP router 718A) is offline, and a second root cause as "Poor coverage" due to uplink asymmetric coverage. Troubleshooting user interface 720 for a second AP device ("AP-45 Kitchen") 718B involved with the identified application session would also include root causes of the connectivity issues at second AP device 718B as determined by application session troubleshooting engine 135/352 if expanded.

Figure 8:
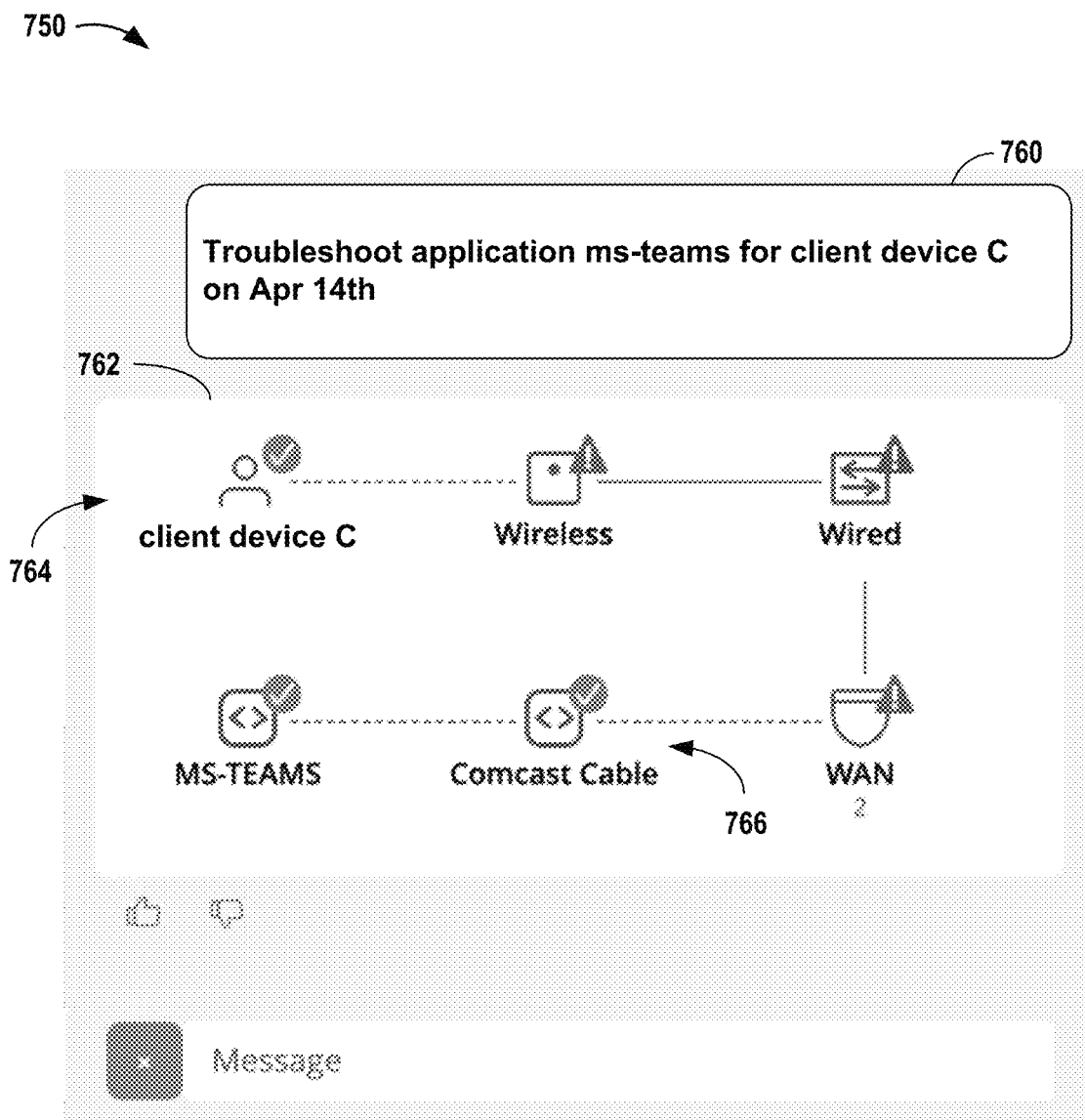
FIG. 8 illustrates an example user interface of the network management system for visualization of an application session-specific topology including a service provider server.

FIG. 8 illustrates an example user interface of NMS 300 for visualization of an application session-specific topology including a service provider server.

FIG. 8 illustrates an example conversational assistant user interface 750 including a query or user input 760 from an administrator via admin device 111 initiating topology visualization and troubleshooting of a particular application session, and an output 762 generated by conversational assistant engine 136, 356. In the example of FIG. 8, the user input 760 to conversational assistant user interface 750 comprises a string indicating the application, a user identifier, and a date (i.e., "Troubleshoot application ms-teams for client device C on Apr 14th," where "ms-teams" indicates the application, "client device C" indicates a client device identifier, and "Apr 14th" indicates the date). Conversational assistant engine 136, 356 may automatically filter the application sessions of one or more network devices associated with the user based on the indicated application (in this example Microsoft Teams®) to identify one or more application sessions of a network device associated with the user that experienced connectivity issues on the specified date.

Conversational assistant user interface 750 presents output 762 for an identified application session. In the illustrated example of FIG. 8, as part of output 762, conversational assistant user interface 750 presents application session-specific topology 764 generated by conversational assistant engine 136, 356 for the identified application session. Application session-specific topology 764 includes a client device ("client device C") running the application, a wireless AP device ("Wireless"), a wired switch ("Wired"), two gateway devices ("WAN"), a service provider server ("Comcast Cable") 766, and the cloud-based application server ("MS-Teams"). In addition, as shown in FIG. 8, application session-specific topology 764 includes indicia of performance or connectivity health for each of the network devices. For example, green circles with checks included on one or more of the network devices (e.g., client device ("client device C"), service provider server ("Comcast Cable") 766, and application server ("MS-Teams")) may indicate no known issues at those network devices during the application session. Gray or red triangles with exclamation points included on one or more network devices (e.g., wired switch ("Wired"), AP device ("Wireless"), and gateway devices ("WAN")) may respectively indicate a moderate or severe connectivity issue at those application devices during the application session.

In order determine and graphically represent connectivity issues of third-party network devices, e.g., service provider server 766, application session troubleshooting engine 136/352 may query a third-party APM vendor for insights data of service provider server 766. In some examples, application session troubleshooting engine 136/352 may perform an on-demand query of the third-party APM vendor for insights data of service provider server 766 in response to user input 760 requesting troubleshooting of the identified application session. In other examples, application session troubleshooting engine 136/352 may perform proactively query the third-party APM vendor for insights data of service provider server 766 to perform monitoring of service provider server 766. Based on the retrieved insights data, conversational assistant engine 136, 356 may generate the indicia of performance or connectivity health for the network devices involved with identified application session, including the third-party network devices such as service provider server 766.

Figure 9:
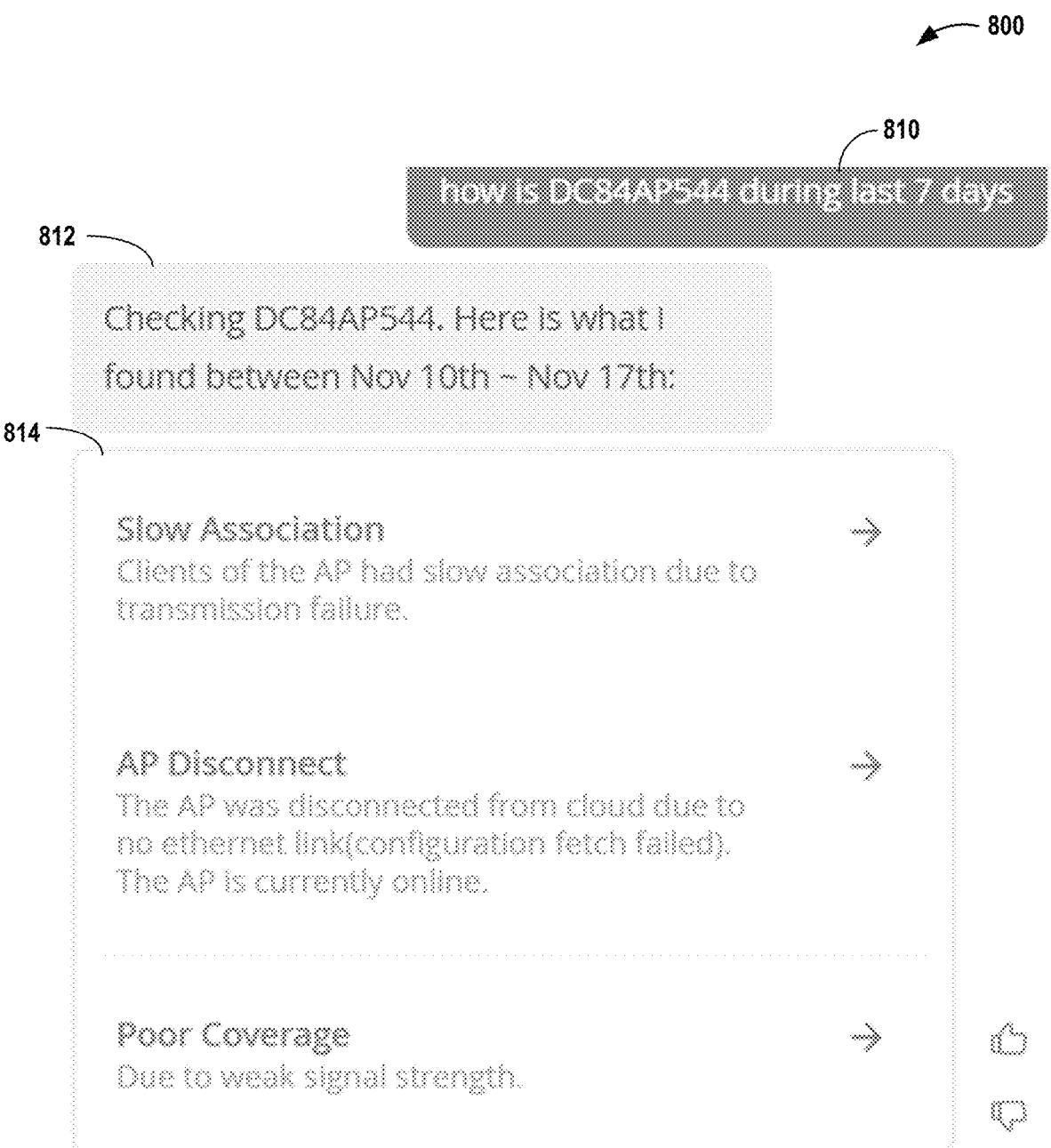
FIG. 9 illustrates an example user interface of the network management system for visualization of a troubleshooting workflow for a group of application sessions for a particular

FIG. 9 illustrates an example user interface of the network management system (NMS) 130/300 for visualization of a troubleshooting workflow for a group of application sessions for a particular AP device.

FIG. 9 illustrates an example conversational assistant user interface 800 including a query or user input 810 from an administrator via admin device 111 initiating troubleshooting of application sessions associated with a particular network device, and a response or output 812, 814 generated by conversational assistant engine 136, 356. In the example of FIG. 9, the user input 810 to conversational assistant user interface 800 comprises a string indicating a device identifier and a duration (i.e., "how is DC84AP544 during last 7 days," where "DC84AP544" comprises an AP device identifier and "7 days," indicates a duration). Conversational assistant engine 136, 356 may automatically filter the application sessions of the particular network device based on the indicated duration (in this example the last 7 days) to identify one or more application sessions of the network device that experienced connectivity issues within the last 7 days.

The response 812 within conversational assistant user interface 800 comprises a string that states "Checking DC84AP544. Here is what I found between November $10^{th}$~November 17th." Conversational assistant user interface 800 also includes troubleshooting user interface 814 for the AP device ("DC84AP544") as a list of root causes of the connectivity issues at the AP device ("DC84AP544") as determined by application session troubleshooting engine 135/352. In the illustrated example of FIG. 9, troubleshooting user interface 814 indicates a first root cause as "Slow Association" because clients of the AP had slow association due to transmission failure, a second root cause as "AP Disconnect" because the AP was disconnected from cloud due to no ethernet link (configuration fetch failed), but the AP is currently online, and a third root cause as "Poor Coverage" due to weak signal strength.

Figure 10:
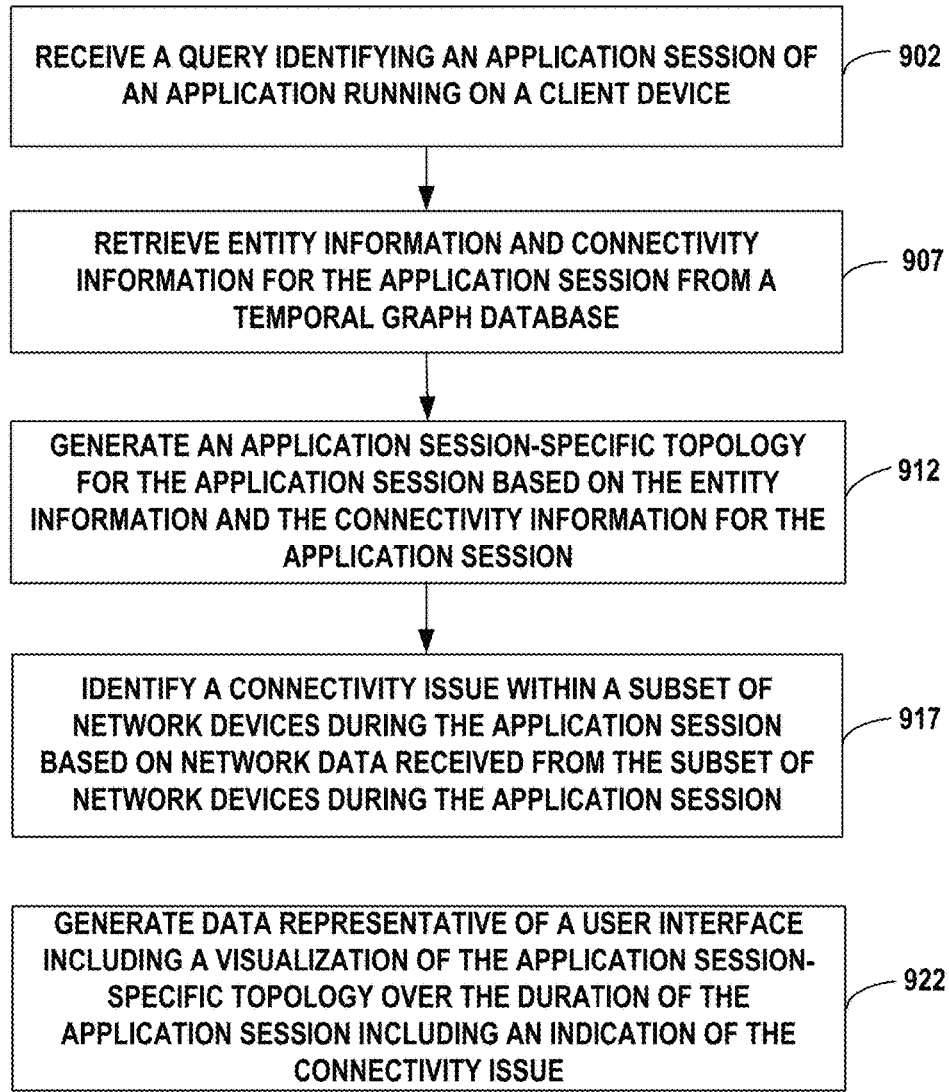
FIG. 10 is a flow chart illustrating an example operation of providing a granular troubleshooting workflow at an application session level using an application session-specific topology from a client device to a cloud-based application server, in accordance with one or more techniques of the disclosure.

FIG. 10 is a flow chart illustrating an example operation of providing a granular troubleshooting workflow at an application session level using an application session-specific topology from a client device to a cloud-based application server, in accordance with one or more techniques of the disclosure. The example operation of FIG. 10 is described herein with respect to NMS 300 of FIG. 3. In other examples, the operation of FIG. 10 may be performed by other computing devices, e.g., NMS 130 of FIGS. 1A-1B.

NMS 300 receives a query identifying an application session of an application running on a client device, wherein the client device comprises one of a plurality of network devices configured to provide client-to-cloud connectivity in a network (902). NMS 300 may correlate application flow data from multiple application flows of the identified application session and determine a subset of network devices from the plurality of network devices that were involved with the application session over the duration of the application session based on the application flow data of the application session. NMS 300 then retrieves entity information and connectivity information for the application session from a temporal graph database 317 based on the determined subset of network devices (907). The entity information represents the subset of network devices involved with the application session over the duration of the application session and is stored as nodes of temporal graph database 317. The connectivity information represents connections between the subset of network devices over the duration of the application session and is stored as edges of temporal graph database 317.

Temporal graph database 317 represents a history of at least a portion of the network at application session-level granularity over a time period. In some examples, NMS 300 may extract the entity information and the connectivity information from telemetry data within network data 316 received from the subset of network devices over the duration of the application session, and update temporal graph database 317 with the connectivity information and entity information for the application session.

NMS 300 generates an application session-specific topology for the application session based on the entity information and the connectivity information for the application session (912). The application session-specific topology may comprise a historical view of the subset of network devices and connections between the subset of network devices over the duration of the application session. NMS 300 identifies at least one connectivity issue within the subset of network devices during the application session based at least on network data received from the subset of network devices during the application session (917). NMS 300 may perform root cause analysis to determine a root cause of the at least one connectivity issue within the subset of network devices during the application session. NMS 300 may analyze network data 316 received from the subset of network devices during the application session to identify one or more third-party application servers, third-party service provider servers, or third-party network devices involved with the application session over a duration of the application session. NMS 300 may then retrieve network data from the one or more third-party application servers, third-party service provider servers, or third-party network devices.

NMS 300 generates data representative of user interface 310 for presentation on an administrator device, with user interface 310 including a visualization of the application session-specific topology over the duration of the application session including an indication of the at least one connectivity issue (922). In some examples, to generate user interface 310, NMS 300 generates an icon representative of at least one network device within the application session-specific topology having the indication of the at least one connectivity issue over the duration of the application session, wherein the indication of the at least one connectivity issue comprises at least one of a color, a shape, or a symbol. In response to receipt of user input selecting the icon representative of the network device having the indication of the at least one connectivity issue, NMS 300 may further generate data representative of a troubleshooting user interface for presentation on the administrator device, the troubleshooting user interface including at least one indication of a root cause of the at least one connectivity issue at the network device. In some further examples, NMS 300 may generate data representative of a conversational assistant user interface comprising a platform configured to receive the query identifying the application session, present the application session-specific topology, and receive user input interacting with the application session-specific topology.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively, or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random-access memory (RAM), read-only memory (ROM), non-volatile random-access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A network management system comprising:
    a memory storing network data received from a plurality of network devices configured to provide client-to-cloud connectivity in a network between one or more client devices and one or more cloud-based application environments; and
    one or more processors coupled to the memory and configured to:
        receive a query identifying an application session of an application for a client device, wherein the client device comprises one of the plurality of network devices, wherein the application is hosted in a cloud-based environment of the one or more cloud-based application environments, wherein the application session includes application flows between a subset of network devices from the plurality of network devices over a duration of the application session, and wherein the subset of network devices includes one or more of access point devices, switches, routers, gateway devices, or service provider servers used to transmit traffic between the client device and the cloud-based environment of the application;
        retrieve entity information and connectivity information for the application session from a temporal graph database, wherein the entity information represents the subset of network devices involved with the application session over the duration of the application session and is stored as nodes of the temporal graph database, wherein the connectivity information represents connections between the subset of network devices over the duration of the application session and is stored as edges of the temporal graph database, and wherein the temporal graph database represents a history of at least a portion of the network at application session-level granularity over a time period that includes the duration of the application session;
        generate an application session-specific topology for the application session based on the entity information and the connectivity information for the application session, wherein the application session-specific topology comprises a historical view of the subset of network devices and connections between the subset of network devices over the duration of the application session;

identify at least one connectivity issue within the subset of network devices during the application session based at least on the network data received from the subset of network devices during the application session; and generate data representative of a user interface for presentation on an administrator device, the user interface including a visualization of the application session-specific topology over the duration of the application session including an indication of the at least one connectivity issue.

2. The system of claim 1, wherein the one or more processors are configured to perform root cause analysis to determine a root cause of the at least one connectivity issue within the subset of network devices during the application session.

3. The system of claim 1, wherein the one or more processors are configured to analyze the network data received from the subset of network devices during the application session to identify one or more third-party application servers, third-party service provider servers, or third-party network devices involved with the application session over a duration of the application session.

4. The system of claim 3, wherein the one or more processors are configured to retrieve insights data from a third-party monitoring vendor for the one or more third-party application servers, third-party service provider servers, or third-party network devices.

5. The system of claim 1, wherein the one or more processors are configured to:

correlate application flow data from multiple application flows of the application session; and determine the subset of network devices, from the plurality of network devices, involved with the application session over the duration of the application session based on the application flow data of the application session, wherein the one or more processors are configured to retrieve the entity information and the connectivity information for the application session from the temporal graph database based on the determined subset of network devices.

6. The system of claim 1, wherein the one or more processors are configured to:

extract the entity information and the connectivity information from telemetry data within the network data received from the subset of network devices over the duration of the application session; and update the temporal graph database with the entity information and the connectivity information for the application session.

7. The system of claim 1, wherein to generate data representative of the user interface, the one or more processors are configured to generate an icon representative of at least one network device within the application session-specific topology having the indication of the at least one connectivity issue over the duration of the application session, wherein the indication of the at least one connectivity issue comprises at least one of a color, a shape, or a symbol.

8. The system of claim 7, wherein the one or more processors are configured to, in response to receipt of user input selecting the icon representative of the network device having the indication of the at least one connectivity issue, generate data representative of a troubleshooting user interface for presentation on the administrator device, the troubleshooting user interface including at least one indication of a root cause of the at least one connectivity issue at the network device.

9. The system of claim 1, wherein the one or more processors are configured to generate data representative of a conversational assistant user interface comprising a platform configured to receive the query identifying the application session, present the application session-specific topology, and receive user input interacting with the application session-specific topology.

10. A method comprising:

receiving, by a network management system, a query identifying an application session of an application for a client device, wherein the client device comprises one of a plurality of network devices configured to provide client-to-cloud connectivity in a network between one or more client devices and one or more cloud-based application environments, wherein the application is hosted in a cloud-based environment of the one or more cloud-based application environments, wherein the application session includes application flows between a subset of network devices from the plurality of network devices over a duration of the application session, and wherein the subset of network devices includes one or more of access point devices, switches, routers, gateway devices, or service provider servers used to transmit traffic between the client device and the cloud-based environment of the application;

retrieving, by the network management system, entity information and connectivity information for the application session from a temporal graph database, wherein the entity information represents the subset of network devices involved with the application session over the duration of the application session and is stored as nodes of the temporal graph database, wherein the connectivity information represents connections between the subset of network devices over the duration of the application session and is stored as edges of the temporal graph database, and wherein the temporal graph database represents a history of at least a portion of the network at application session-level granularity over a time period that includes the duration of the application session;

generating, by the network management system, an application session-specific topology for the application session based on the entity information and the connectivity information for the application session, wherein the application session-specific topology comprises a historical view of the subset of network devices and connections between the subset of network devices over the duration of the application session;

identifying, by the network management system, at least one connectivity issue within the subset of network devices during the application session based at least on network data received from the subset of network devices during the application session; and generating, by the network management system, data representative of a user interface for presentation on an administrator device, the user interface including a visualization of the application session-specific topology over the duration of the application session including an indication of the at least one connectivity issue.

11. The method of claim 10, further comprising performing root cause analysis to determine a root cause of the at least one connectivity issue within the subset of network devices during the application session.

12. The method of claim 10, further comprising analyzing the network data received from the subset of network devices during the application session to identify one or more third-party application servers, third-party service provider servers, or third-party network devices involved with the application session over a duration of the application session.

13. The method of claim 12, further comprising retrieving insights data from a third-party monitoring vendor for the one or more third-party application servers, third-party service provider servers, or third-party network devices.

14. The method of claim 10, further comprising:
correlating application flow data from multiple application flows of the application session; and
determining the subset of network devices, from the plurality of network devices, involved with the application session over the duration of the application session based on the application flow data of the application session,
wherein retrieving the entity information and the connectivity information for the application session comprises retrieving the entity information and the connectivity information for the application session from the temporal graph database based on the determined subset of network devices.

15. The method of claim 10, further comprising:
extracting the entity information and the connectivity information from telemetry data within the network data received from the subset of network devices over the duration of the application session; and
updating the temporal graph database with the entity information and the connectivity information for the application session.

16. The method of claim 10, wherein generating the data representative of the user interface comprises generating an icon representative of at least one network device within the application session-specific topology having the indication of the at least one connectivity issue over the duration of the application session, wherein the indication of the at least one connectivity issue comprises at least one of a color, a shape, or a symbol.

17. The method of claim 16, further comprising generating, in response to receipt of user input selecting the icon representative of the network device having the indication of the at least one connectivity issue, data representative of a troubleshooting user interface for presentation on the administrator device, the troubleshooting user interface including at least one indication of a root cause of the at least one connectivity issue at the network device.

18. A computer-readable storage medium comprising instructions that, when executed, cause one or more processors of a network management system to:

receive a query identifying an application session of an application running on a client device, wherein the client device comprises one of a plurality of network devices configured to provide client-to-cloud connectivity in a network between one or more client devices and one or more cloud-based application environments, wherein the application is hosted in a cloud-based environment of the one or more cloud-based application environments, wherein the application session includes application flows between a subset of network devices from the plurality of network devices over a duration of the application session, and wherein the subset of network devices includes one or more of access point devices, switches, routers, gateway devices, or service provider servers used to transmit traffic between the client device and the cloud-based environment of the application;

retrieve entity information and connectivity information for the application session from a temporal graph database, wherein the entity information represents the subset of network devices involved with the application session over the duration of the application session and is stored as nodes of the temporal graph database, wherein the connectivity information represents connections between the subset of network devices over the duration of the application session and is stored as edges of the temporal graph database, and wherein the temporal graph database represents a history of at least a portion of the network at application session-level granularity over a time period that includes the duration of the application session;

generate an application session-specific topology for the application session based on the entity information and the connectivity information for the application session, wherein the application session-specific topology comprises a historical view of the subset of network devices and connections between the subset of network devices over the duration of the application session;

identify at least one connectivity issue within the subset of network devices during the application session based at least on network data received from the subset of network devices during the application session; and generate data representative of a user interface for presentation on an administrator device, the user interface including a visualization of the application session-specific topology over the duration of the application session including an indication of the at least one connectivity issue.

* * * * *